US012784059B2

(12) United States Patent
Isom et al.

(10) Patent No.: US 12,784,059 B2
(45) Date of Patent: Nov. 3, 2026

(54) REAL-TIME CONTROL SYSTEM FOR CARBON INTENSITY COMPLIANCE IN A HYDROGEN PRODUCTION FACILITY

(71) Applicant: Air Products and Chemicals, Inc., Allentown, PA (US)

(72) Inventors: Joshua D. Isom, Allentown, PA (US); Matthew D. Urich, Emmaus, PA (US); Christopher H. Goheen, Waynesboro, PA (US); Farrah A. Haeri, Macungie, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 19 days.

(21) Appl. No.: 18/610,594

(22) Filed: Mar. 20, 2024

(65) Prior Publication Data

US 2025/0299201 A1 Sep. 25, 2025

(51) Int. Cl.
*G06Q 30/018* (2023.01)
*G05B 15/02* (2006.01)

(52) U.S. Cl.
CPC .......... *G06Q 30/018* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 9,890,908 B1 | 2/2018 | Esmaili et al. | |
| 9,897,259 B1 | 2/2018 | Mancilla et al. | |
| 9,897,260 B1 | 2/2018 | Mancilla et al. | |
| 9,915,399 B1 | 3/2018 | Latshaw et al. | |
| 10,323,798 B2 | 6/2019 | Esmaili et al. | |
| 10,337,674 B2 | 7/2019 | Mancilla et al. | |
| 10,415,760 B2 | 9/2019 | Isom et al. | |
| 2007/0119718 A1* | 5/2007 | Gibson | C25B 1/04 205/637 |
| 2019/0032947 A1* | 1/2019 | Willmott | F24F 11/54 |
| 2022/0283575 A1* | 9/2022 | Mehta | G05B 13/0265 |
| 2023/0322550 A1 | 10/2023 | Foody | |
| 2024/0046190 A1 | 2/2024 | Wilbek et al. | |

* cited by examiner

*Primary Examiner* — George Chen
(74) *Attorney, Agent, or Firm* — Matthew R. Weaver

(57) ABSTRACT

A method of operating a hydrogen production facility to meet carbon intensity (CI) requirements, the method comprising: receiving operational parameter data from the hydrogen production facility, the operational parameter data being representative of measured and/or determined time-dependent values of operational parameters of the hydrogen production facility; processing the operational parameter data to define one or more linear terms, wherein the linear terms are linear with respect to one or more CI reference models; generating, from the linear terms, control system CI values representative of the CI of hydrogen produced by the hydrogen production facility; generating control variables for controlling one or more operational parameters of the hydrogen production facility; and controlling the hydrogen production facility in accordance with the determined control variables.

15 Claims, 8 Drawing Sheets

REAL-TIME CONTROL SYSTEM FOR CARBON INTENSITY COMPLIANCE IN A HYDROGEN PRODUCTION FACILITY

BACKGROUND OF THE INVENTION

The present invention relates to a computer-implemented method of, and control system for, operating a hydrogen production facility to meet carbon intensity (CI) requirements. In embodiments, the present invention relates to a control system for low-carbon hydrogen supply with carbon intensity calculations and a carbon intensity reference model.

The control system may comprise a carbon intensity calculator, a carbon intensity reference model, and a controller. The carbon intensity calculator may determine the carbon intensity of hydrogen produced by a hydrogen production unit based on input data from various sensors and sources. The carbon intensity reference model may provide a reference value for the carbon intensity of hydrogen based on predefined criteria and parameters. The controller may calculate setpoints which are used to adjust operational parameters of a hydrogen production facility.

Industrial gas supply networks comprise one or more processes defining the production, transformation, transporting and distribution of gases for end-user applications.

In general, the inputs to industrial gas supply networks are feedstock elements (which may include raw materials and/or gaseous or liquid chemicals for production of gas or gas precursors) and energy sources to power those production and refining processes. The ultimate outputs of industrial gas supply networks are gaseous and/or liquified products delivered to end users. In certain applications, industrial gases may be used as fuel gases or liquified fuel gases for end users.

Hydrogen supply networks are of significant importance because they supply fuels vital for the functioning of economies around the world. However, hydrogen supply networks are increasingly scrutinized because the production, processing, distribution, and end uses of fuels are often associated with the environmental pollutants.

The technical field of the supply and use of fuels has undergone significant changes in recent years. Many of these changes have been driven by the urgent need to reduce greenhouse gas emissions and mitigate the impacts of climate change. As a result, there has been a growing interest in the development of low carbon and renewable fuels that can help to reduce the carbon intensity (CI) of transportation and other energy-intensive sectors.

Governments around the world have been implementing strict limits on the CI of fuels used in various applications. These limits have spurred innovation in the production, transportation, and processing of low carbon fuels, as well as the development of new technologies and systems for managing their CI throughout a hydrogen supply network.

Hydrogen is a versatile fuel and energy source that can be used for numerous applications, including power generation, transport, industry, and heating. Hydrogen can also contribute to the decarbonization of the global energy supply chain due to the ability to produce hydrogen from renewable sources and emit no greenhouse gases (GHGs) when used. However, not all hydrogen is produced in a low-carbon or carbon neutral manner. Depending on the feedstock and the production process, hydrogen can have different levels of GHG emissions and environmental impacts.

Low-carbon hydrogen comprises hydrogen produced in such a manner that the hydrogen has a low greenhouse gas (GHG) emission intensity. GHG emission intensity relates to the amount of GHG emissions per unit of energy output.

Low-carbon hydrogen can be produced from various sources and methods, provided they meet a predefined GHG emission reduction threshold compared to conventional hydrogen production from fossil fuels. The GHG emission reduction threshold may vary depending on the jurisdiction, regulation, or standard that applies to the low-carbon hydrogen production and use. For example, the European Commission sets a threshold of 28.9 gCO2e/MJ.

There are two main categories of low-carbon hydrogen production methods: blue and green. Blue hydrogen is produced from fossil fuels, such as natural gas or coal, with carbon capture and utilization or storage (CCUS) to reduce the GHG emissions from the production process. Green hydrogen is produced from water electrolysis using electricity from renewable or nuclear sources, which generate no direct GHG emissions.

Other categories of low-carbon hydrogen production methods may include turquoise hydrogen, which is produced from methane pyrolysis with solid carbon capture; yellow hydrogen, which is produced from solar-driven thermochemical water splitting; and pink hydrogen, which is produced from water electrolysis using electricity from nuclear fusion.

Low-carbon hydrogen has the potential to decarbonize the transportation and heavy industrial sectors by replacing or blending with fossil fuels that have higher GHG emission intensities. For example, low-carbon hydrogen can be used as a fuel for fuel cell vehicles, such as cars, trucks, and trains, that emit only water as a by-product.

Low-carbon hydrogen can also be used as a feedstock for synthetic fuels, such as ammonia or methanol, that can be used in internal combustion engines or turbines. Low-carbon hydrogen can also be used as a substitute for natural gas or coal in industrial processes that require high-temperature heat or chemical reactions, such as oil refining, petrochemicals, steel, biofuels, and power generation. The use of low-carbon hydrogen in these sectors can reduce their GHG emissions significantly and contribute to achieving climate goals and targets.

Recognizing the tremendous potential for hydrogen to decarbonize the transportation and industrial sectors, governments worldwide have established incentive programs for the production and use of low-carbon hydrogen. Examples of these programs include the California Low Carbon Fuel Standard, the Oregon Clean Fuel Standard, the Washington State Clean Fuel Standard, the United States Inflation Reduction Act, the British Columbia Low Carbon Fuel Standard, and the United Kingdom Low Carbon Hydrogen Standard.

Although these programs have several important distinctions, they all share a few common core features. First, in order to qualify for incentives, the producers and users of low-carbon hydrogen must demonstrate that the carbon intensity of hydrogen must fall below a specified threshold.

Secondly, the demonstration must be done through specific requirements, including carbon intensity verification. Thirdly, the verification must be based on specific Microsoft Excel-based lifecycle models which are mandated by the incentive programs.

Details on the specifics of the California Low Carbon Fuel Standard, the Oregon Clean Fuel Standard, the Washington State Clean Fuel Standard, the United States Inflation Reduction Act, the British Columbia Low Carbon Fuel Standard, and the United Kingdom Low Carbon Hydrogen Standard are provided for reference below.

California Low Carbon Fuel Standard (LCFS)

The California Low Carbon Fuel Standard (LCFS) is a regulation that aims to reduce the GHG emissions from transportation fuels by requiring fuel providers to gradually lower the CI of their products. The LCFS sets annual CI targets for different types of fuels, such as gasoline, diesel, ethanol, biodiesel, natural gas, hydrogen, and electricity. Fuel providers must either meet the CI targets by blending low-carbon fuels with conventional fuels, or buy credits from other providers who have excess low-carbon fuels.

The CA GREET model is a California-specific version of the Argonne National Laboratory's GREET (Greenhouse Gases, Regulated Emissions, and Energy Use in Transportation) model, which is a well-to-wheel life cycle analysis tool implemented in Microsoft Excel that calculates the GHG emissions of various transportation fuels. The CA GREET model is used to generate the CI values of all fuel pathways in the LCFS program, including lookup table pathways and applicant-specific Tier 1 and Tier 2 pathways.

The CA GREET model has been updated several times since its inception in 2009. The current version is CA-GREET3.0, which is based on GREET1_2016 and was released in 2018. The CA-GREET3.0 model includes new feedstocks, processes, and pathways for biofuels, such as used cooking oil, corn oil, cellulosic ethanol from corn fiber, biomethane from anaerobic digestion of organic waste, dairy manure, wastewater sludge, and landfill gas. The CA-GREET3.0 model also allows users to select different regions for feedstock production, electricity generation, crude oil basket, and natural gas production parameters.

In December 2023, the California Air Resources Board released a proposed version update to its model, known as CA-GREET4.0, which is based on US GREET1_2023. It also released a proposed Tier 1 calculator, also implemented in Microsoft Excel.

Oregon Clean Fuel Standard

The Oregon Clean Fuel Standard (OCFS) is a regulation that aims to reduce the GHG emissions from transportation fuels by requiring fuel providers to gradually lower the carbon intensity (CI) of their products. The CI is a measure of the GHG emissions per unit of energy of a fuel, expressed in grams of carbon dioxide equivalent per megajoule (gCO2e/MJ). The OCFS sets annual CI targets for different types of fuels, such as gasoline, diesel, ethanol, biodiesel, renewable diesel, natural gas, hydrogen, and electricity. Fuel providers must either meet the CI targets by blending low-carbon fuels with conventional fuels, or buy credits from other providers who have excess low-carbon fuels.

The Oregon GREET Excel model is a modified version of the Argonne National Laboratory's GREET model, which is a well-to-wheel life cycle analysis tool that calculates the GHG emissions of various transportation fuels. The Oregon GREET model is used to generate the CI values of all fuel pathways in the OCFS program, including lookup table pathways and applicant-specific Tier 1 and Tier 2 pathways.

The Oregon GREET model has been updated several times since its inception in 2016. The current version is OR-GREET3.0, which is based on GREET1_2016 and was released in 2018. The OR-GREET3.0 model includes new feedstocks, processes, and pathways for biofuels, such as used cooking oil, corn oil, cellulosic ethanol from corn fiber, biomethane from anaerobic digestion of organic waste, dairy manure, wastewater sludge, and landfill gas. The OR-GREET3.0 model also allows users to select different regions for feedstock production, electricity generation, crude oil basket, and natural gas production parameters.

Washington Clean Fuel Standard

The Washington State Clean Fuel Program is a regulation that aims to reduce the carbon intensity of transportation fuels by 20% below 2017 levels by 2034. Carbon intensity is a measure of how much greenhouse gas emissions are produced per unit of energy. The program requires fuel suppliers to either produce or blend low-carbon fuels, such as low-carbon hydrogen, or purchase credits from low-carbon fuel providers.

Low-carbon hydrogen is hydrogen that is produced with minimal or no greenhouse gas emissions, such as through electrolysis using renewable electricity or steam methane reforming with carbon capture and storage. The program incentivizes the production and use of low-carbon hydrogen by assigning it a low or negative carbon intensity value, depending on the production method and the electricity source. This means that low-carbon hydrogen can generate credits that can be sold to fuel suppliers who need to comply with the program.

Carbon intensity is calculated by using a life-cycle analysis approach that accounts for the energy and emissions associated with the production, transportation, and use of a fuel. The program uses the GREET model, developed by the Argonne National Laboratory, as the primary tool for calculating carbon intensity values for different fuels and pathways. The GREET model is a spreadsheet-based model that covers various stages of fuel life cycles, such as feedstock extraction, fuel conversion, distribution, and vehicle operation. The model also allows users to compare the energy and environmental impacts of different fuels and vehicle technologies.

The Washington state GREET model, or WA-GREET, is a modified version of the California GREET model, or CA-GREET, which is in turn based on the US GREET model developed by the Argonne National Laboratory. The WA-GREET model is used to calculate the carbon intensity of transportation fuels for the Washington Clean Fuel Program, which aims to reduce greenhouse gas emissions from the transportation sector.

The main differences between the WA-GREET model and the US GREET model are:

The WA-GREET model uses more recent and region-specific data for fuel production and consumption in Washington state, such as electricity grid mix, natural gas composition, ethanol and biodiesel feedstocks, and petroleum refining.

The WA-GREET model incorporates some updates and corrections from the CA-GREET model, such as revised emission factors for fossil fuel extraction and processing, updated carbon capture and storage parameters, and improved allocation methods for co-products.

The WA-GREET model includes some new fuel pathways that are not available in the US GREET model, such as renewable diesel from tallow, renewable jet fuel from corn oil, and hydrogen from landfill gas.

The WA-GREET model is intended to reflect the specific conditions and characteristics of the Washington state transportation fuel market and to support the implementation of the Clean Fuel Program. The US GREET model is a more general and comprehensive tool that covers various fuel life cycles and vehicle technologies for the entire US.

United States Inflation Reduction Act

The United States Inflation Reduction Act (IRA) was implemented into federal law in August 2022. It aims to curb inflation by possibly reducing the federal government budget deficit, lowering prescription drug prices, and investing in domestic energy production while promoting clean energy.

One of the key provisions of the IRA is to support the development and deployment of low-carbon hydrogen as a clean fuel for various sectors, such as transportation, industry, and power generation. Low-carbon hydrogen is hydrogen that has a low lifecycle GHG emission intensity, which measures the amount of GHG emissions per unit of energy output.

The IRA offers financial incentives for low-carbon hydrogen production and use, such as tax credits, grants, and loans. The amount of incentive depends on the carbon intensity of the hydrogen, which is calculated using a standardized methodology specified in the IRA. The lower the carbon intensity, the higher the incentive.

The IRA adopts the GREET model as the official tool to calculate the carbon intensity of hydrogen through the point of production (well-to-gate). The GREET model is a full life-cycle model developed by the Argonne National Laboratory that evaluates the energy and emission impacts of various fuels and vehicle technologies. The GREET model accounts for all the GHG emissions associated with hydrogen production, such as feedstock extraction, processing, transportation, and conversion. The GREET model also considers the GHG emissions avoided by using low-carbon hydrogen instead of fossil fuels.

The GREET model is widely used by researchers, regulators, and industry to assess the environmental benefits of low-carbon hydrogen and other biofuels. The IRA requires hydrogen producers to use the GREET model to report their carbon intensity to the IRS and other relevant agencies in order to qualify for the incentives.

The most recent version of the GREET model is known as R&D GREET 2023. R&D GREET 2023 is relevant for qualifying for 45V credits under the Inflation Reduction Act, because it provides background data that is required to be used in establishing provisional emissions rates. Argonne National Laboratory also released a new Excel-based model designated as 45VH2-GREET, which is the Excel model that must be used to perform carbon intensity calculations to qualify hydrogen production as eligible for tax credits under Section 45V of the US tax code.

British Columbia Low Carbon Fuel Standard

The British Columbia low carbon fuel standard (BC-LCFS) is a provincial regulation that aims to reduce the CI of transportation fuels used in the province. The CI is a measure of the GHG emissions per unit of energy output of a fuel over its full life cycle. The BC-LCFS sets declining CI targets for gasoline and diesel fuel pools, and requires fuel suppliers to either supply fuels with lower CI than the targets, or purchase credits from other suppliers who do so.

The BC-LCFS incentivizes the consumption of low-carbon hydrogen by rewarding fuel suppliers who blend hydrogen with gasoline or diesel, or provide hydrogen as a standalone fuel for vehicles. Hydrogen has a lower CI than fossil fuels, especially if it is produced from renewable sources or with carbon capture and storage. Fuel suppliers can generate credits by supplying low-carbon hydrogen, and sell them to other suppliers who need to comply with the BC-LCFS. The credit price reflects the value of reducing GHG emissions from transportation fuels.

The GHGenius model is a life cycle analysis tool that calculates the energy and emission impacts of various fuels and vehicle technologies. It was developed by (S&T) Squared Consultants for Natural Resources Canada, and is available for free download. The BC-LCFS uses the GHGenius model as the official method to determine the CI of hydrogen and other fuels. Fuel suppliers must use the GHGenius model to report their CI to the provincial government, and follow the guidelines and assumptions specified in the BC-LCFS.

The GHGenius model calculates the CI of hydrogen by accounting for all the GHG emissions associated with hydrogen production, distribution, and use. It considers factors such as feedstock type, production technology, energy inputs, transportation mode, storage losses, and vehicle efficiency. It also accounts for the GHG emissions avoided by displacing fossil fuels with hydrogen. The GHGenius model uses data from various sources, such as government statistics, industry reports, and scientific literature, to estimate the GHG emissions of each stage of the hydrogen life cycle.

United Kingdom Low Carbon Hydrogen Standard

The UK low carbon hydrogen standard (LCHS) is a federal regulation that defines what constitutes 'low carbon hydrogen' at the point of production. It sets a maximum threshold for GHG emissions allowed in the production process for hydrogen to be considered 'low carbon hydrogen'. The LCHS aims to ensure that new hydrogen production supported by the government contributes to the UK's carbon reduction and net zero targets.

The LCHS is closely related to the UK hydrogen production business model (HPBM), which is a contractual support mechanism that provides revenue support to low carbon hydrogen producers. The HPBM is designed to overcome the cost gap between low carbon hydrogen and higher carbon fuels, and to incentivize investment in low carbon hydrogen production and use. The HPBM will be delivered through a private law contract (the Low Carbon Hydrogen Agreement) between a government appointed counterparty and a hydrogen producer.

To qualify for the HPBM, hydrogen producers must comply with the LCHS, which means they must calculate and report the CI of their hydrogen production pathway using a standardized methodology specified in the LCHS guidance. The CI is a measure of the GHG emissions per unit of energy output of a fuel over its full life cycle. The LCHS sets a CI threshold of 20 grams of CO2 equivalent per megajoule of hydrogen.

The UK hydrogen emissions calculator (HEC) is an Excel-based tool that helps hydrogen producers to calculate and report their CI under the LCHS. The HEC is based on a life cycle analysis model that accounts for all the GHG emissions associated with hydrogen production, distribution, and use. It considers factors such as feedstock type, production technology, energy inputs, transportation mode, storage losses, and vehicle efficiency. It also accounts for the GHG emissions avoided by displacing fossil fuels with hydrogen.

The HEC is mandatory for hydrogen producers who apply for the HPBM or the Net Zero Hydrogen Fund, which are both government funding schemes that support low carbon hydrogen production. The HEC is also recommended for other hydrogen producers who want to demonstrate compliance with the LCHS or claim low carbon status for their hydrogen.

SUMMARY

There exists a need in the art to provide a control system which is operable to enable accurate control of hydrogen production facilities in order to meet carbon intensity requirements and constraints.

However, there are a number of technical challenges to the realization of this. First, the existence of multiple calculation contexts for carbon intensity presents a significant challenge for any control system. For example, as discussed above, the United States, Canada, California, Oregon, Washington, British Columbia, and Alberta all specify different models for calculating carbon intensity.

In addition, with the exception of the Canada model, all of the carbon intensity models are in the form of complicated Microsoft Excel workbooks having dozens of sheets and tens of thousands of parameters. These models are unsuitable both in practical and in computational terms for providing any kind of continuous (and possibly real-time) information to enable effective production facility control.

Therefore, there exists a need in the art to provide more effective methods and control systems to address these issues.

SUMMARY OF THE INVENTION

The following introduces a selection of concepts in a simplified form in order to provide a foundational understanding of some aspects of the present disclosure. The following is not an extensive overview of the disclosure and is not intended to identify key or critical elements of the disclosure or to delineate the scope of the disclosure. The following merely summarizes some of the concepts of the disclosure as a prelude to the more detailed description provided thereafter.

In general terms, the present disclosure is directed to a process and low-carbon hydrogen control system to control the production of hydrogen to meet the carbon intensity requirements specified by government incentive programs.

The plurality of hydrogen production facilities comprise means for producing hydrogen at a variable rate. The means for producing hydrogen may include any suitable technology or process that can produce low-carbon hydrogen from renewable or fossil sources, such as electrolysis, gasification, steam methane reforming with carbon capture, utilization, and storage (CCUS), or any combination thereof.

Several preferred aspects of the methods and systems according to the present invention are outlined below.

Aspect 1: A computer-implemented method of operating a hydrogen production facility to meet carbon intensity (CI) requirements, the method being executed by at least one hardware processor and comprising: receiving, using a computer system, operational parameter data from the hydrogen production facility, the operational parameter data being representative of measured and/or determined time-dependent values of one or more operational parameters of the hydrogen production facility; processing, using a computer system, the operational parameter data to define one or more linear terms, wherein the linear terms are linear with respect to one or more CI reference models; generating, from the one or more linear terms, control system CI values representative of the CI of hydrogen produced by the hydrogen production facility; generating, using a computer system and based on a function of the control system CI values, control variables for controlling one or more operational parameters of the hydrogen production facility; and controlling the hydrogen production facility in accordance with the determined control variables.

Aspect 2: The computer-implemented method of Aspect 1, wherein the operational parameter data comprises measured and/or determined time-dependent values for one or more operational parameters relating to materials and/or energy input to the hydrogen production facility and materials and/or energy output from the hydrogen production facility.

Aspect 3: The computer-implemented method of Aspect 2, wherein the one or more operational parameters are selected from the group of: a quantity of hydrogen produced; a quantity of electricity consumed; a quantity of steam produced; a quantity of syngas produced; a quantity of carbon monoxide produced; and a quantity of electricity produced.

Aspect 4: The computer-implemented method of Aspect 2 or 3, wherein the step of processing comprises applying one or more non-linear transforms to the operational parameter data for one or more operational parameters to define the one or more linear terms.

Aspect 5: The computer-implemented method of Aspect 4, wherein one or more of the linear terms specify ratio of materials and/or energy inputs to the hydrogen production facility to materials and/or energy outputs from the hydrogen production facility.

Aspect 6: The computer-implemented method of Aspect 5, wherein one or more of the linear terms specify a measured energy or material flow input to the hydrogen production facility divided by one of: a total mass flow rate of hydrogen and coproducts produced at the hydrogen production facility; a total molar flow rate of hydrogen and coproducts produced at the hydrogen production facility; a total economic value of hydrogen and coproducts produced at the hydrogen production facility.

Aspect 7: The computer-implemented method of Aspect 5 or 6, wherein one or more of the linear terms specify a measured energy or material flow input to the hydrogen production facility divided by a total energy rate of hydrogen and coproducts produced at the hydrogen production facility.

Aspect 8: The computer-implemented method of Aspect 7, wherein one or more coproducts comprises a gas and the total energy rate is determined as the product of the flow rate of the gas and its lower heating value.

Aspect 9: The computer-implemented method of Aspect 8, wherein a coproduct comprises electricity and the energy rate is the generated electric power.

Aspect 10: The computer-implemented method of any one of Aspects 1 to 9, wherein the step of generating control system CI values comprises determining a sum of the product of each of the one or more linear terms with a corresponding linear coefficient, the linear coefficients being derived from one or more of the CI reference models.

Aspect 11: The computer-implemented method of Aspect 10, further comprising the step of updating the linear coefficients based on a perturbation of one or more of the CI reference models.

Aspect 12: The computer-implemented method of any one of Aspects 1 to 11, wherein the steps of generating control variables and controlling the hydrogen production facility utilize model predictive control.

Aspect 13: A system for operating a hydrogen production facility to meet carbon intensity (CI) requirements, the system comprising: at least one hardware processor: a data acquisition module configured to receive operational parameter data from the hydrogen production facility, the operational parameter data being representative of measured and/or determined time-dependent values of one or more operational parameters of the hydrogen production facility; a CI determination module configured: to process the operational parameter data to define one or more linear terms, wherein the linear terms are linear with respect to one or more carbon intensity reference models; and to generate, from the one or more linear terms, control system CI values representative of the CI of hydrogen produced by the hydrogen production facility; a production control module configured to generate, based on a function of the control system CI values, control variables for controlling one or more operational parameters of the hydrogen production facility; and a process controller configured to control the hydrogen production facility in accordance with the determined control variables.

Aspect 14: The system of Aspect 13, wherein the operational parameter data comprises measured and/or determined time-dependent values for one or more operational parameters relating to materials and/or energy input to the hydrogen production facility and materials and/or energy output from the hydrogen production facility.

Aspect 15: The system of Aspect 14, wherein the CI determination module is configured to apply one or more non-linear transforms to the operational parameter data for one or more operational parameters to define the one or more linear terms.

Aspect 16: The system of Aspect 14 or 15, wherein one or more of the linear terms specify ratio of materials and/or energy inputs to the hydrogen production facility to materials and/or energy outputs from the hydrogen production facility.

Aspect 17: The system of Aspect 16, wherein one or more of the linear terms specify a measured energy or material flow input to the hydrogen production facility divided by a total energy rate of hydrogen and coproducts produced at the hydrogen production facility.

Aspect 18: The system of Aspect 17, wherein one or more coproducts comprises a gas and the total energy rate is determined as the product of the flow rate of the gas and its lower heating value and/or wherein a coproduct comprises electricity and the energy rate is the generated electric power.

Aspect 19: The system of any one of Aspects 13 to 18, wherein the production control module and process controller comprise a model predictive controller operable to generate the control variables and control the hydrogen production facility.

Aspect 13A: A system for operating a hydrogen production facility to meet carbon intensity (CI) requirements, the system comprising at least one hardware processor and being configured to perform a method comprising: receiving, using a computer system, operational parameter data from the hydrogen production facility, the operational parameter data being representative of measured and/or determined time-dependent values of one or more operational parameters of the hydrogen production facility; processing the operational parameter data to define one or more linear terms, wherein the linear terms are linear with respect to one or more carbon intensity reference models; generating, from the one or more linear terms, control system CI values representative of the CI of hydrogen produced by the hydrogen production facility; generating, based on a function of the control system CI values, control variables for controlling one or more operational parameters of the hydrogen production facility; and controlling the hydrogen production facility in accordance with the determined control variables.

Aspect 13B: The system of Aspect 13A, wherein the step of processing comprises applying one or more non-linear transforms to the operational parameter data for one or more operational parameters to define the one or more linear terms.

Aspect 13C: The system of Aspect 13A or 13B, further comprising a model predictive controller operable to generate the control variables and control the hydrogen production facility.

Aspect 20: A non-transitory computer readable storage medium storing a program of instructions executable by a machine to perform a method of operating a hydrogen production facility to meet carbon intensity (CI) requirements, the method being executed by at least one hardware processor and comprising: receiving, using a computer system, operational parameter data from the hydrogen production facility, the operational parameter data being representative of measured and/or determined time-dependent values of one or more operational parameters of the hydrogen production facility; processing, using a computer system, the operational parameter data to define one or more linear terms, wherein the linear terms are linear with respect to one or more carbon intensity reference models; generating, from the one or more linear terms, control system CI values representative of the CI of hydrogen produced by the hydrogen production facility; generating, using a computer system and based on a function of the control system CI values, control variables for controlling one or more operational parameters of the hydrogen production facility; and controlling the hydrogen production facility in accordance with the determined control variables.

Aspect A1: A computer-implemented method of updating a control system for a hydrogen production facility using one or more carbon intensity (CI) reference models, the control system being operable to control one or more operational parameters of the hydrogen production facility based on generated control system CI values representative of the CI of hydrogen produced by the hydrogen production facility, the method being executed by at least one hardware processor and comprising: a) receiving, using a computer system, operational parameter data from the hydrogen production facility, the operational parameter data being representative of measured and/or determined time-dependent values of one or more operational parameters of the hydrogen production facility; b) processing, using a computer system, the operational parameter data to define one or more linear terms, wherein the linear terms are linear with respect to one or more CI reference models, the c) generating, as a function of the one or more linear terms and one or more linear coefficients, the control system CI values; d) extracting one or more reference model inputs from the one or more linear terms; e) inputting the reference model inputs into one or more CI reference models to generate updated reference CI values for the hydrogen production facility; f) utilizing the updated CI reference values to generate, using the one or more CI reference models, updated linear coefficients; and g) updating the control system with the updated linear coefficients.

Aspect A2: The method of Aspect A1, wherein steps a) to c) are repeated at a higher frequency than steps d) and e).

Aspect A3: The method of Aspect A1 or A2, wherein steps d) and e) are repeated at a higher frequency than steps f) and g).

Aspect A4: The method of Aspect A1, A2 or A3, wherein step d) comprises applying one or more non-linear transforms to the linear terms to generate the one or more reference model inputs.

Aspect A5: The method of any one of Aspects A1 to A4, wherein the operational parameter data comprises measured and/or determined time-dependent values for one or more operational parameters relating to materials and/or energy input to the hydrogen production facility and materials and/or energy output from the hydrogen production facility.

Aspect A6: The method of Aspect A5, wherein the one or more operational parameters are selected from the group of: a quantity of hydrogen produced; a quantity of electricity consumed; a quantity of steam produced; a quantity of syngas produced; a quantity of carbon monoxide produced; and a quantity of electricity produced.

Aspect A7: The method of any one of Aspects A1 to A6, wherein step b) comprises applying one or more non-linear transforms to the operational parameter data for one or more operational parameters to define the one or more linear terms.

Aspect A8: The method of Aspect A5 or A6, wherein one or more of the linear terms specify the ratio of materials and/or energy inputs to the hydrogen production facility to materials and/or energy outputs from the hydrogen production facility.

Aspect A9: The method of Aspect A5 or A6, wherein one or more of the linear terms specify a measured energy or material flow input to the hydrogen production facility divided by one of: a total mass flow rate of hydrogen and coproducts produced at the hydrogen production facility; a total molar flow rate of hydrogen and coproducts produced at the hydrogen production facility; a total economic value of hydrogen and coproducts produced at the hydrogen production facility.

Aspect A10: A control system for a hydrogen production facility using one or more carbon intensity (CI) reference models, the control system being configured to control one or more operational parameters of the hydrogen production facility based on generated control system CI values representative of the CI of hydrogen produced by the hydrogen production facility, the control system comprising: at least one hardware processor; a data acquisition module configured to receive operational parameter data from the hydrogen production facility, the operational parameter data being representative of measured and/or determined time-dependent values of one or more operational parameters of the hydrogen production facility; a CI determination module configured: to process the operational parameter data to define one or more linear terms, wherein the linear terms are linear with respect to one or more CI reference models; and to generate, as a function of the one or more linear terms and one or more linear coefficients, the control system CI values; a reference model module configured: to extract one or more reference model inputs from the one or more linear terms; and to input the reference model inputs into one or more CI reference models to generate updated reference CI values for the hydrogen production facility; an update module configured: to utilize the updated CI reference values to generate, using the one or more CI reference models, updated linear coefficients; and to update the control system with the updated linear coefficients.

Aspect A11: The control system of Aspect A10, further configured such that the control system CI values are generated at a higher frequency than the updated reference CI values.

Aspect A12: The control system of Aspect A10 or A11, further configured such that the updated reference CI values are generated at a higher frequency than the control system is updated with the updated linear coefficients.

Aspect A13: The control system of any one of Aspects A10, 11 or 12, wherein the reference model module is further configured to apply one or more non-linear transforms to the linear terms to generate the one or more reference model inputs.

Aspect A14: The control system of any one of Aspects A10, 11, 12 or 13, wherein the operational parameter data comprises measured and/or determined time-dependent values for one or more operational parameters relating to materials and/or energy input to the hydrogen production facility and materials and/or energy output from the hydrogen production facility.

Aspect A15: The control system of any one of Aspects A10 to A14, wherein the one or more operational parameters are selected from the group of: a quantity of hydrogen produced; a quantity of electricity consumed; a quantity of steam produced; a quantity of syngas produced; a quantity of carbon monoxide produced; and a quantity of electricity produced.

Aspect A16: The control system of any one of Aspects A10 to A15, wherein the CI determination module is configured to apply one or more non-linear transforms to the operational parameter data for one or more operational parameters to define the one or more linear terms.

Aspect A17: The control system of any one of Aspects A10 to A16, wherein one or more of the linear terms specify the ratio of materials and/or energy inputs to the hydrogen production facility to materials and/or energy outputs from the hydrogen production facility.

Aspect A18: The control system of any one of Aspects A10 to A17, wherein one or more of the linear terms specify a measured energy or material flow input to the hydrogen production facility divided by one of: a total mass flow rate of hydrogen and coproducts produced at the hydrogen production facility; a total molar flow rate of hydrogen and coproducts produced at the hydrogen production facility; a total economic value of hydrogen and coproducts produced at the hydrogen production facility.

A non-transitory computer readable storage medium storing a program of instructions executable by a machine to perform a method of updating a control system for a hydrogen production facility using one or more carbon intensity (CI) reference models, the control system being operable to control one or more operational parameters of the hydrogen production facility based on generated control system CI values representative of the CI of hydrogen produced by the hydrogen production facility, the method being executed by at least one hardware processor and comprising: a) receiving, using a computer system, operational parameter data from the hydrogen production facility, the operational parameter data being representative of measured and/or determined time-dependent values of one or more operational parameters of the hydrogen production facility; b) processing, using a computer system, the operational parameter data to define one or more linear terms, wherein the linear terms are linear with respect to one or more CI reference models, the c) generating, as a function of the one or more linear terms and one or more linear coefficients, the control system CI values; d) extracting one or more reference model inputs from the one or more linear terms; e) inputting the reference model inputs into one or more CI reference models to generate updated reference CI values for the hydrogen production facility; f) utilizing the updated CI reference values to generate, using the one or more CI reference models, updated linear coefficients; and g) updating the control system with the updated linear coefficients.

BRIEF DESCRIPTION OF DRAWINGS

Embodiments of the present invention will now be described by example only and with reference to the figures in which.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION OF THE INVENTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

The present invention is directed to the technical field of control systems for hydrogen production facilities to meet greenhouse gas intensity constraints.

The technology described herein provides technical improvements to the existing control of variables related to industrial hydrogen production in accordance with carbon intensity requirements and regulations. Technical improvements enable one or more production facilities to be controlled in order to manage technical considerations and constraints on hydrogen production.

Overview of Hydrogen Production Facility

Figure 1:
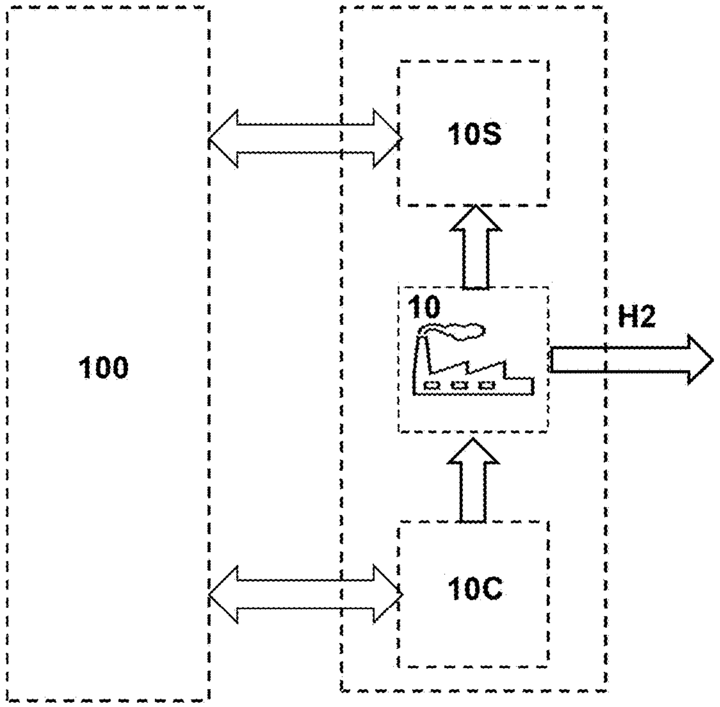
FIG. 1 is a schematic diagram of a hydrogen production facility and associated control system.

FIG. 1 shows a general schematic diagram of a hydrogen production facility 10. In FIG. 1, the production facility 10 is operable to produce hydrogen from feedstocks. The production facility 10 is configured to produce hydrogen at a production rate which is selectable and can be varied as a function of time between maximum and minimum levels.

In other words, the production facility 10 can produce hydrogen at a selected variable rate. Hydrogen produced in the production step may be, but is not necessarily limited to, “blue” hydrogen produced from fossil fuels (such as natural gas or coal) with carbon capture and utilization or storage (CCUS) to reduce the GHG emissions from the production process or “green” hydrogen produced using renewable energy.

The means for producing hydrogen may include any suitable technology or process that can produce low-carbon hydrogen from renewable or fossil sources. For example, the production facility 10 may comprise a hydrogen production plant comprising an electrolyser operable to produce hydrogen by electrolysis of feedstocks such as water, brine or steam. Alternatively, the production facility 10 may comprise a gasification plant or a reformer operable to produce liquid or gaseous hydrogen through steam reforming using methane as a feedstock.

Alternatively, hydrogen may be produced from a hydrogen production plant forming part of an ammonia production plant. An ammonia production plant may, in examples, comprise a hydrogen production plant, an air separation unit (ASU) and an ammonia synthesis plant. Storage for produced hydrogen may also be provided.

In order to reduce the carbon intensity of the production process, electricity for powering the production facility 10 may generated at least in part by renewable energy sources such as wind and/or the solar power sources although other sources may optionally be utilized. Green fuel produced using renewable power sources will have very low to zero CI at the point of production.

Different production facilities 10 may have different capacities, efficiencies, costs, and environmental impacts. In addition, whilst only a single hydrogen production facility 10 is shown for clarity, there is no practical limit to the number of hydrogen production facilities that may be included.

The production facility 10 is communicatively coupled to one or more sensor elements 10S. Sensor elements 10S are operable to measure the values of one or more operational parameters of the production facility 10. In embodiments, the sensor elements 10S are operable to measure the values of one or more operational parameters of the production facility 10 as a function of time (in other words, time-dependent variables are measured).

The measured operational parameters may be selected in dependence upon the type of production facility 10 that is in question. However, operational parameters may comprise one or more of the following: rate of production of hydrogen, power consumption (which may comprise electricity consumption), rate of consumption of feedstocks (e.g., natural gas, coal etc.), rate of capture of carbon dioxide, and rate of steam production (where appropriate).

The measured operational parameters may be measured directly (e.g., flow rate may be measured by a flow sensor) or indirectly through other parameters (e.g. calculated or otherwise determined from one or more other measurements).

In addition, the process plant 10 is communicatively coupled to one or more control elements 10C. Control elements 10C are operable to control, for example, the rate of the hydrogen production process in question, type of power supply, amount of power, ramp rates, throughput rate of materials (e.g., feedstocks, intermediates, and fuels to produce hydrogen).

Control systems typically maintain a control setpoint (e.g., a throughput or flow setpoint) and are associated with one or more sensors (such as, in non-limiting examples, flow rate meters, pressure sensors, temperature sensors etc.) and actuators (such as, in non-limiting examples, pumps, valves, compressors, or blowers) to regulate the throughput of materials through the process.

The hydrogen production facility 10 is communicatively coupled to a control system 100. The control system 100 is operable to receive data from the sensor elements 10S and to control the control elements 10C. The function of these components will be described in more detail below with reference to FIG. 2.

Control System 100

Figure 2:
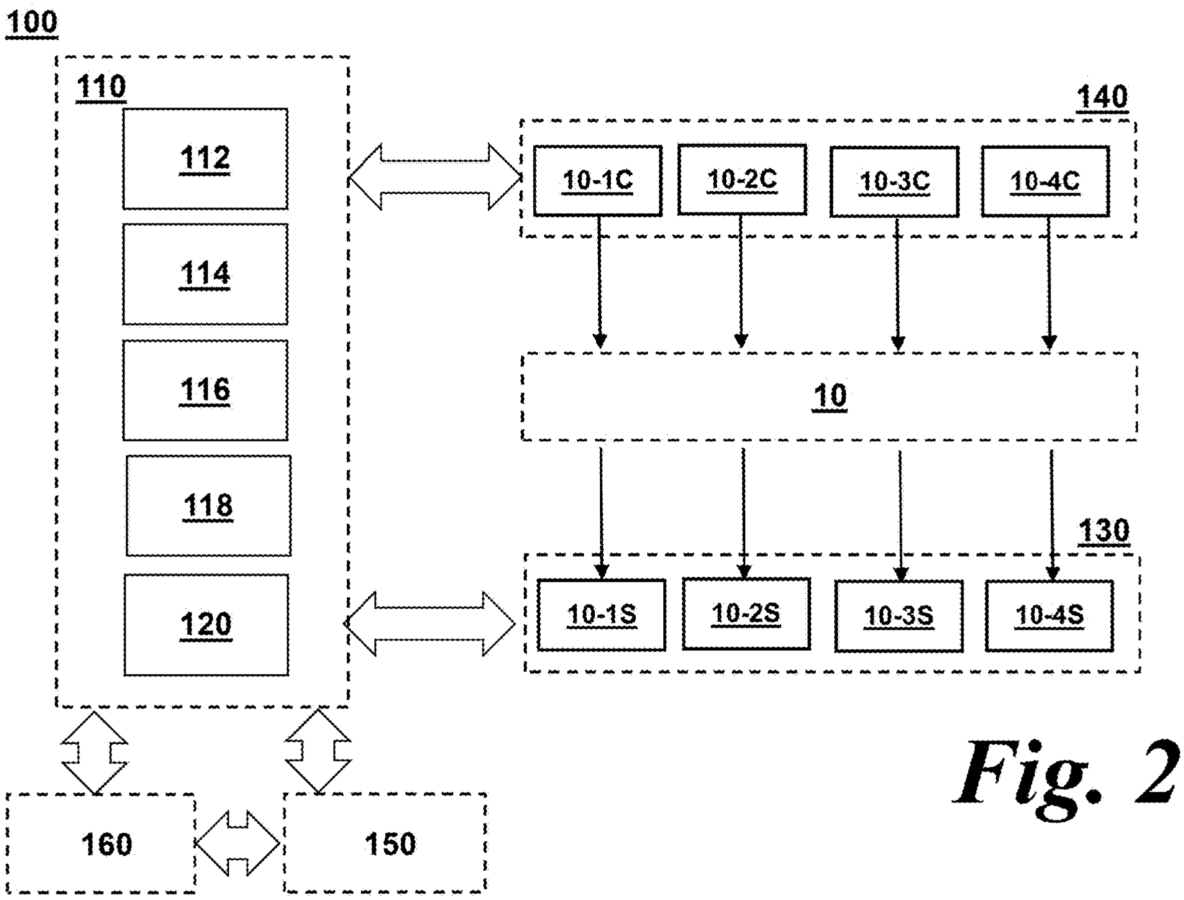
FIG. 2 is a schematic diagram of a control system according to an embodiment.

FIG. 2 shows a schematic diagram of a control system 100 for controlling elements of the hydrogen production facility.

In embodiments, the present invention provides a method of, and system for, controlling processes within the hydrogen production facility to meet carbon intensity requirements. In embodiments, the control system 100 is operable to receive inputs from technical sources and determine optimum operating parameters for one or more production facilities 10 as described below in order to meet carbon intensity requirements.

In specific embodiments, the present invention is operable to enable interfacing between plant control systems and reference carbon intensity models to enable carbon intensity constraints to be met under multiple contexts.

The control system 100 comprises a controller 110. The controller 110 comprises at least one hardware processor 112 and at least one non-transitory memory 114. The controller 110 further comprises a data acquisition module 116, a carbon intensity determination module 118, and a control module 120.

The control system 100 further comprises a data block 130 for obtaining and transmitting data from the production facility 10 and a process controller 140 to enable control of the production facility 10. Finally, the control system 100 comprises a reference model module 150 and an update module 160.

The data block 130 is arranged to receive inputs from the sensors 10S or other components of the production facility 10. In embodiments, the data block 130 comprises one or more sensors 10-1S, 10-2S, 10-3S, 10-4S. In embodiments, the production facility 10 comprises one or more sensors 10-1S, 10-2S, 10-3S, 10-4S of the data block 130.

The sensors 10-1S, 10-2S, 10-3S enable reporting of operational process parameters. In embodiments, this may be in real-time and continuous. For example, in embodiments, data relating to operational process parameters may comprise the time-dependent values of one or more of the following parameters: flow rates, pressures, temperatures, rate of production of hydrogen, power consumption (which may comprise electricity consumption), rate of consumption of feedstocks (e.g., natural gas, coal etc.), rate of capture of carbon dioxide, and rate of steam production (where appropriate).

In addition, the data block 130 may comprise other data input elements 10-nS as required. These data input elements are not limited to sensors and sensor data and may include reporting or determined technical values on additional elements of the production facility 10. In embodiments, this may include technical information relating to production information, availability or CI values of fuels and processes, amongst others.

In summary, the data block 130 is operable to measure, derive and/or determine operational parameter data relating to time-dependent values of one or more operational parameters of the process plant 10. In embodiments, the data block 130 is operable to measure, derive and/or determine operational parameter data relating to time-dependent values of one or more operational parameters relating to materials and/or energy input to the process plant 10 and one or more operational parameters relating to materials and/or energy output from the process plant 10.

Data Acquisition Module 116

The data acquisition module 116 is configured to collect data on the production facility 10 and is operable to receive and process sensor data and other data inputs from the data input block 120. The data acquisition module 116 communicates with the carbon intensity determination module 118 and the control module 120 to provide them with the necessary data for their functions.

The data acquisition module 116 is operable to generate and/or collate input data for the carbon intensity determination module 118 as described below.

For the purpose of illustration, in specific embodiments the input data obtained may include one or more of the following measurable and/or determinable parameters: a quantity of hydrogen produced; a quantity of electricity consumed; a quantity of steam produced; a quantity of syngas produced; a quantity of carbon monoxide produced; and a quantity of electricity produced.

Carbon Intensity Determination Module 118

The carbon intensity determination module 118 is operable to process the sensor and other operational characteristic data obtained from the data block 130 and received by the data acquisition module 116 and perform computational processing thereon to generate data corresponding to the carbon intensity of the hydrogen produced by the production facility 10 such that the data is consistent with carbon intensity reference models. This data so generated can then be utilized by the control module 120 to control the process controller 140 to adjust setpoints of the controls 10C of the production plant 10.

The carbon intensity determination module 118 may be configured to determine the carbon intensity of hydrogen produced at the production facility 10 and to enable control thereof. In embodiments, CI values are dependent on control variables such as production facility 10 rates because production facility 10 efficiencies have a dependence upon production facility rates.

In embodiments, the sensors 10-1S, 10-2S, 10-3S enable real-time and continuous reporting of production facility 10 operational process parameters. For example, in embodiments, operational process parameters may comprise one or more of the following: flow rates, pressures, temperatures, rate of production of hydrogen, power consumption (which may comprise electricity consumption), rate of consumption of feedstocks (e.g., natural gas, coal etc.), rate of capture of carbon dioxide, and rate of steam production (where appropriate).

The sensor data is received from the data acquisition module 116 by the carbon intensity determination module 118 and the received data is processed therein.

In embodiments, the processing comprises performing one or more mathematical transforms on the received operational parameter data (which may comprise measured sensor data). In embodiments, the mathematical transforms comprise nonlinear transformations which are operable to convert the received operational parameter data into one or more linear terms.

In embodiments, the transformation of the received operational parameter data to linear terms enable a direct correlation with one or more reference model carbon intensities. In other words, the linear terms have a linear effect on reference model carbon intensities. Once the linear terms have been derived, they may be stored in the memory 114.

In embodiments, the linear terms have a specific form. In embodiments, the linear terms may be representative of ratio of inputs to the process plant 10 to outputs from the process plant 10.

For example, in specific embodiments, the specific form of one or more of the linear terms may comprise expressions specifying a measured energy or material flow forming an input to the process plant 10, divided by expressions specifying a total mass flow rate of hydrogen and coproducts produced at the process plant 10.

In embodiments, the form of one or more of the linear terms may comprise expressions specifying a measured energy or material flow that is an input to the hydrogen production facility, divided by expressions specifying a total energy rate of hydrogen and coproducts produced at the facility.

In embodiments, if one or more coproducts is a gas, the total energy rate is determined as the product of the flow rate of the gas and its lower heating value. Alternatively or additionally, if the coproduct is electricity, the energy rate is the power of the electricity.

In alternative or additional specific embodiments, the specific form of one or more of the linear terms may comprise expressions specifying a measured energy or material flow forming an input to the process plant 10, divided by expressions specifying a total molar flow rate of hydrogen and coproducts produced at the process plant 10.

In alternative or additional specific embodiments, the specific form of one or more of the linear terms may comprise expressions specifying a measured energy or material flow forming an input to the process plant 10, divided by expressions specifying a total a total economic value of hydrogen and coproducts produced at the process plant 10.

Finally, for illustration purposes, consider the specific examples given above in relation to the data acquisition module 116 where the input data obtained includes one or more of the following measurable and/or determinable parameters: a quantity of hydrogen produced; a quantity of electricity consumed; a quantity of steam produced; a quantity of syngas produced; a quantity of carbon monoxide produced; and a quantity of electricity produced.

In this context, examples of linear terms may include: the ratio (natural gas consumed)/(hydrogen produced); the ratio (electricity consumed)/(hydrogen produced); the ratio (steam produced)/(hydrogen produced); and the ratio (electricity produced)/(hydrogen produced).

In the above examples, the non-linear transformation in each case is the determination of the ratio. Consequently, the non-linear transformation of the input parameters of natural gas consumed and hydrogen consumed is (natural gas consumed)/(hydrogen produced) to produce the relevant linear term, and so on.

Once the linear terms have been generated, the carbon intensity values for the control of the production facility 10 can be derived. The carbon intensity values are calculated from a linear combination of the linear terms. By this is meant that the carbon intensity values are obtained from the sum of the product of each linear term with a corresponding linear coefficient.

The linear coefficient corresponds to a scaling factor or weighting applied to each linear term. This may be selected as appropriate based on suitable physical, dynamic or mathematical considerations. In embodiments, as described below, the linear coefficients may be determined from one or more carbon intensity reference models.

Once the carbon intensity values have been derived, they can be sent to the production control module 120 to enable control of the production facility 10. In embodiments, the generated carbon intensity values correspond to those of one or more reference models. However, the approach of the present invention enables the generated carbon intensity values to be produced on timescales and frequencies that enable real-time (or substantially real-time) control of the production facility 10. This is in contrast to known arrangements and models which are computationally complex and incapable of being used to directly control production processes in real time.

Production Control Module 120

The production control module 120 is configured to generate a signal operable to enable control the production rates and other operational parameters of the production facility 10 based on the carbon intensity values derived by the carbon intensity determination module 118.

In embodiments, the processing performed by the carbon intensity determination module 118 generates a set of linear terms based on non-linear transformations of the relevant input parameters for the production facility 10. The carbon intensity values are then calculated as a linear combination of the generated linear terms.

In embodiments, the linear terms may be represented as rational functions, i.e. functions where the numerator and denominator comprise polynomials. Any of the linear terms described above in relation to the carbon intensity determination module 118 may be described in this manner.

Consequently, in embodiments, the rational functions so generated may be utilized by the production control module 120 to enable control of the processes of the production facility 10. In embodiments, the process control module 120 may comprise a digital control system (DCS) using a model predictive controller which supports a family of variable transformations such as rational functions.

As a result, a model predictive controller so configured may be operable to utilize the rational functions generated from the linear terms and/or carbon intensity values and generate control signals therefrom. This process is described in detail below.

The production control module 120 may use any suitable algorithm or technique to generate control setpoint values to enable adjustment of the production rates of the production facility 10 in real time according to the changes in the network conditions and demands. The production control module 120 may also communicate with the production facility 10.

In embodiments, the production control module 120 may further comprise control elements operable to provide control signals (e.g., control setpoints) to the process controller 140 to control one or more control elements 10-1C, 10-2C, 10-3C, 10-4C of the process controller 140. In embodiments, the production control module 120 is operable to generate production facility 10-1, 10-2, 10-3, 10-4 rates which are communicated to the process controller 140.

The production control module 120 is operable to communicate with process controller 140 as described below.

The control system 100 comprises the process controller 140 which comprises a plurality of control elements 10-1C, 10-2C, 10-3C, 10-4C . . . 10-nC associated with at least some of the production facility 10 . . . 10-*n*.

In embodiments, the parameters controlled by the process controller 140 may include operation rate of the hydrogen production process in question, type of power supply, amount of power, ramp rates, flow rates, pressures, temperatures, throughput rate of materials (e.g., feedstocks, intermediates, and fuels to produce hydrogen). These parameters are regulated by the control elements/control systems 10-1C, 10-20, 10-3C, 10-4C . . . 10-nC associated with the production facility 10.

Control systems typically maintain a control setpoint (e.g., a throughput or flow setpoint) and are associated with one or more sensors (such as, in non-limiting examples, flow rate meters, pressure sensors, temperature sensors etc.) and actuators (such as, in non-limiting examples, pumps, valves, compressors, or blowers) to regulate the throughput of materials through the process. These systems may comprise any suitable controller, for example, proportional-integral-derivative (PID) controllers.

Each production process of the production facility 10 will, in practice, have a maximum and minimum operational capacity. In general, in a dynamic operation a maximum rate of change will apply (this corresponds to the ramp rate). These constraints are typically set by safety, mechanical, electronic, material or other physical constraints within the equipment.

The difference between the maximum and minimum operating points defines the range of operation. Process constraints place constraints on the maximum and minimum capacity for each process, together with constraints on the rate of change of production capacity (i.e., ramp rates) in response to controller set point changes. Physical equipment limitations, quality and/or safety parameters may also apply.

The above limitations may be determined by the process controller 140 and the process(es) controlled by a throughput setpoint value either determined locally or provided by the control module 120 of the controller 110.

In embodiments, the production facility 10-1, 10-2, 10-3, 10-4 rate values determined by the process control module 120 are provided to the process controller 140 which is operable to control the production facility 10 dynamically (through control elements 10-1C, 10-20, 10-3C, 10-4C . . . 10-nC) in response to this data.

In specific embodiments, the process controller 140 comprises a model predictive control (MPC) system. In embodiments, the MPC system comprises a multivariable control algorithm that utilizes an internal dynamic model of the production facility 10-1, 10-2, 10-3, 10-4 components, an appropriate cost function, and an optimization algorithm. In embodiments, the optimization algorithm is operable to minimize the cost function using a plurality of control inputs to control elements 10-1C, 10-2C, 10-3C, 10-4C . . . 10-nC.

However, in embodiments, alternative functions may be used. These may involve, for example, similarity functions which are maximized.

The process controller 140 is arranged to receive production facility 10-1, 10-2, 10-3, 10-4 rate values determined by the process control module 118 and derive a production facility 10-1, 10-2, 10-3, 10-4 operation policy including set point operation parameters over a predetermined future time horizon. These are then fed to the control elements 10-1C, 10-20, 10-30, 10-4C . . . 10-nC to control the relevant processes controlled thereby. In embodiments, it may utilize linear empirical models obtained by system identification of the various processes.

Alternatively, or additionally, in embodiments, it may utilize non-linear high-fidelity models or non-linear models created from a machine learning algorithm. The process controller 140, knowing the desired production facility 10-1, 10-2, 10-3, 10-4 rates, may utilize the MPC system to optimize the control set points and processes for a present time period, whilst also being able to adapt for future time periods. This is achieved, in embodiments, by optimizing a finite time horizon for the processes whilst implementing the current time period. The optimization is then performed again at the next time period for another finite time horizon.

In embodiments, the present invention provides a control system 100 operable to enable selective control of processes within the hydrogen supply network N to achieve predetermined outcomes when operating the hydrogen supply network N.

It will be understood that the above terms “module”, “block” and “element” are non-limiting terms and do not necessarily imply any interconnection or grouping between the component parts of the systems 100, 110, 130, 140 which may be illustrated in a common grouping for clarity purposes only.

Variations are possible. For example, the carbon intensity determination module 118 may not be a separate module and may be directly integrated with the production control module 120. This may, in embodiments, be the case if the production control module 120 comprises a model predictive controller such as ASPEN DMC which supports a family of variable transformations such as rational functions.

Alternatively, in embodiments, the production control module 120 may operate under open loop conditions. For example, data generated by the carbon intensity determination module 118 may be manually entered or programmed into the production control module 120 without automatic feedback.

Reference Model Module 150

The control system 100 further comprises a reference model module 150. The reference model module 150 is operable to receive the linear terms determined by the carbon intensity determination module 118 and to apply one or more non-linear transformations to the linear terms to generate reference model inputs.

The reference model inputs are inputted into a reference model. In embodiments, the reference model may comprise a Microsoft Excel workbook. The reference model is then operable to determine reference carbon intensities directly using an applicable carbon intensity reference model. The resulting carbon intensity data may be stored in memory 114.

The reference model module 150 may process linear term data at a lower frequency than the processing of measurement sensor data by the carbon intensity determination module 118.

Update Module 160

The update module 160 is operable to use the determined reference carbon intensities produced by the reference model in the reference model module 150 to update the linear coefficients used to generate the control carbon intensity values by the carbon intensity determination module 118.

The update module 160 utilizes the determined reference carbon intensities produced by the reference model in the reference model module 150 and the linear terms generated by the carbon intensity determination module 118 to generate updated linear coefficients. The updated linear coefficients are sent to the carbon intensity determination module 118 periodically.

In embodiments, the update module 160 may process data and generate updated data at a lower frequency than the processing of measurement sensor data by the carbon intensity determination module 118. In embodiments, the update module 160 may process data and generate updated data at a lower frequency than the reference model module 150 processes data to generate an updated reference model.

Method

Figure 3:
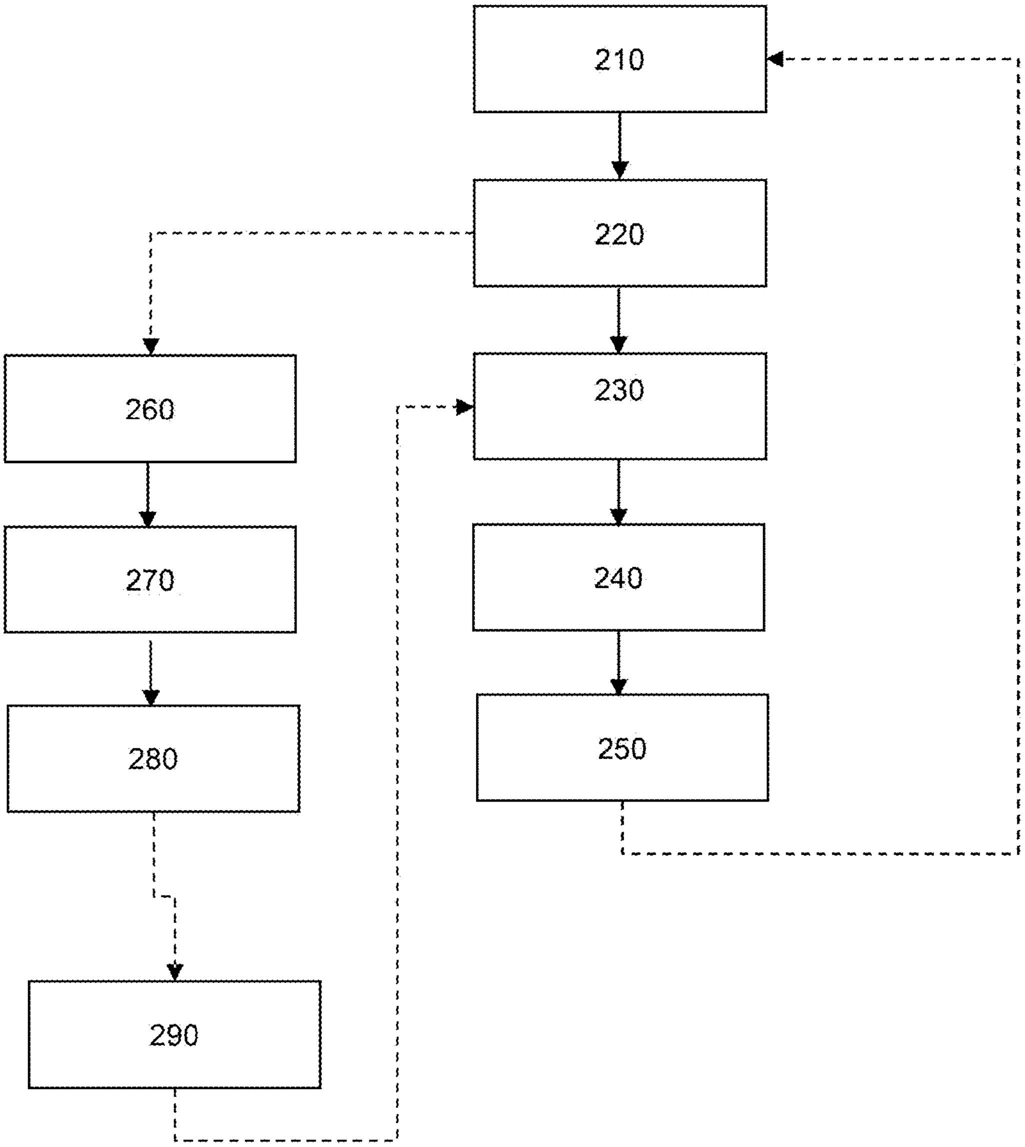
FIG. 3 is a flow diagram of a method according to an embodiment.
Figure 4:
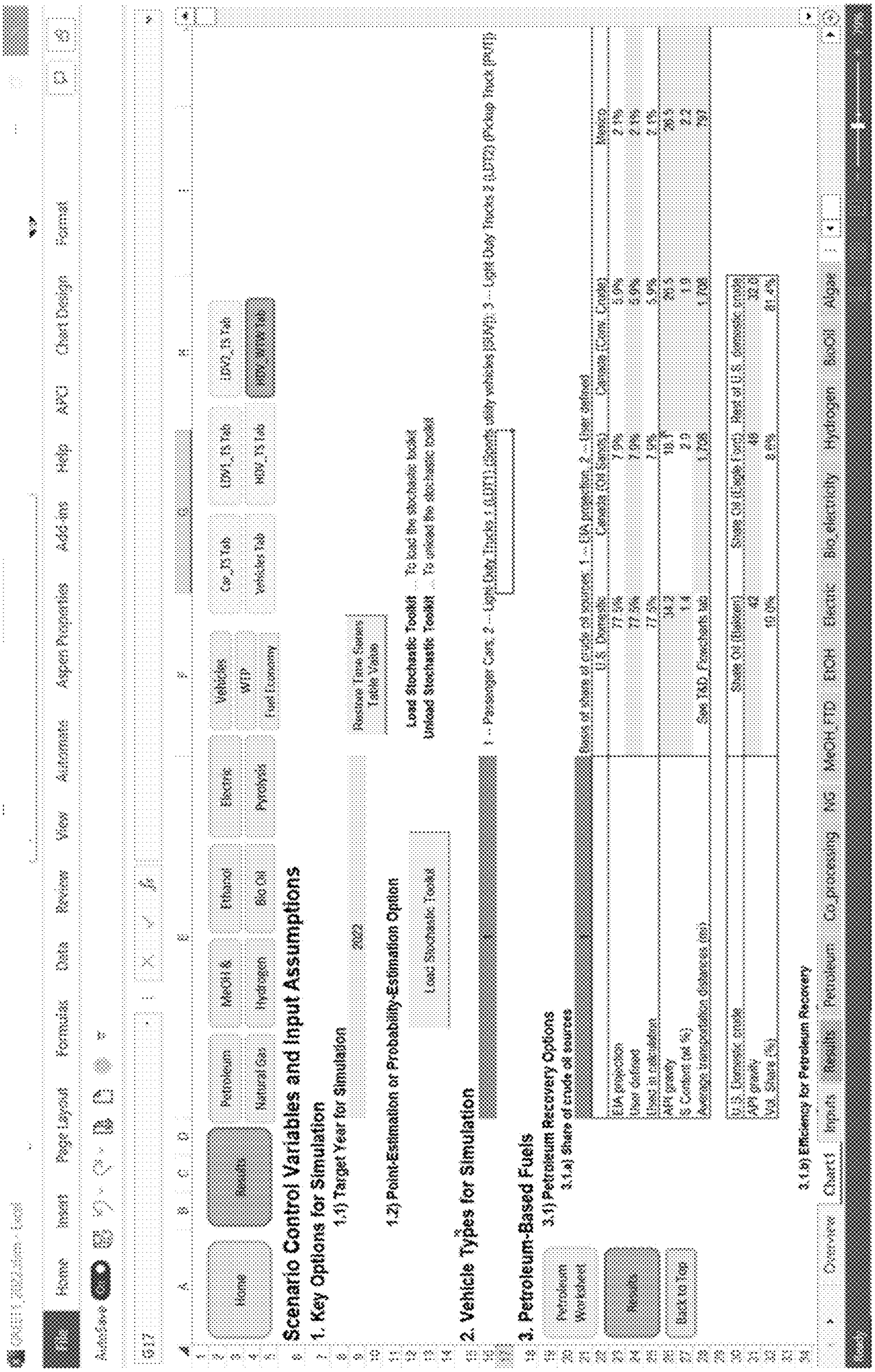
FIGS. 4 to 9 illustrate an operational example of an embodiment of the present invention.

FIG. 3 shows a method 200 according to an embodiment. In embodiments, there is provided a computer-implemented method of operating a hydrogen production facility to meet carbon intensity (CI) requirements. The method is implemented on a computer system utilizing at least one hardware processor 112 and having memory 114 and operable to receive inputs from the data block 130 amongst others.

The method comprises three control groups. Steps 210-250 define a first control loop for generation of carbon intensity control data for control of the process facility 10. In embodiments, this may be a closed loop system. Steps 220 and 260 to 270 comprise a second control process for generating data from a reference model. Finally, steps 280 and 230 define a final process for updating linear coefficients.

Step 210: Obtain Operational Parameter Data

At step 210, operational parameter data (which may comprise measured sensor data) is received from the hydrogen production facility. The operational parameter data is representative of measured and/or determined time-dependent values of one or more operational parameters of the hydrogen production facility.

In embodiments, the sensors 10-1S, 10-2S, 10-3S may be used to measure and report time-dependent values of one or more operational process parameters of the hydrogen process facility 10. In embodiments, this may be in real-time and continuous.

In embodiments, operational process parameters may comprise one or more of the following: flow rates, pressures, temperatures, rate of production of hydrogen, power consumption (which may comprise electricity consumption), rate of consumption of feedstocks (e.g., natural gas, coal etc.), rate of capture of carbon dioxide, and rate of steam production (where appropriate).

In addition, the data block 130 may comprise other data input elements 10-nS as required. These data input elements are not limited to sensors and sensor data and may include reporting or determined technical values on additional elements of the production facility 10. In embodiments, this may include technical information relating to production information, availability or CI values of fuels and processes, amongst others.

For the purpose of illustration, in specific embodiments the operational parameter data obtained may include one or more of the following measurable and/or determinable parameters: a quantity of hydrogen produced; a quantity of electricity consumed; a quantity of steam produced; a quantity of syngas produced; a quantity of carbon monoxide produced; and a quantity of electricity produced.

In summary, step 210 is operable to measure, derive and/or determine operational parameter data relating to time-dependent values of one or more operational parameters of the process plant 10. In embodiments, step 210 is operable to measure, derive and/or determine operational parameter data relating to time-dependent values of one or more operational parameters relating to materials and/or energy input to the process plant 10 and one or more operational parameters relating to materials and/or energy output from the process plant 10.

Once the operational parameter data (which may comprise measured sensor data) is obtained, the method proceeds to step 220.

Step 220; Determine Linear Terms

At step 220, the operational parameter data is processed to define one or more linear terms. The linear terms are linear with respect to one or more carbon intensity reference models.

In embodiments, the processing comprises performing one or more mathematical transforms on the received measured sensor data to generate the linear terms. In embodiments, the mathematical transforms comprise nonlinear transformations which are operable to convert the received operational parameter data into one or more linear terms.

In embodiments, the transformation of the received operational parameter data to linear terms enable a direct correlation with one or more reference model carbon intensities. In other words, the linear terms have a linear effect on reference model carbon intensities. Once the linear terms have been derived, they may be stored in the memory 114.

In embodiments, the linear terms have a specific form. In embodiments, the linear terms may be representative of ratio of inputs to the process plant 10 to outputs from the process plant 10.

For example, in specific embodiments, the specific form of one or more of the linear terms may comprise expressions specifying a measured energy or material flow forming an input to the process plant 10, divided by expressions specifying a total mass flow rate of hydrogen and coproducts produced at the process plant 10.

In embodiments, the form of one or more of the linear terms may comprise expressions specifying a measured energy or material flow that is an input to the hydrogen production facility, divided by expressions specifying a total energy rate of hydrogen and coproducts produced at the facility.

In embodiments, if one or more coproducts is a gas, the total energy rate is determined as the product of the flow rate of the gas and its lower heating value. Alternatively or additionally, if the coproduct is electricity, the energy rate is the power of the electricity.

In alternative or additional specific embodiments, the specific form of one or more of the linear terms may comprise expressions specifying a measured energy or material flow forming an input to the process plant 10, divided by expressions specifying a total molar flow rate of hydrogen and coproducts produced at the process plant 10.

In alternative or additional specific embodiments, the specific form of one or more of the linear terms may comprise expressions specifying a measured energy or material flow forming an input to the process plant 10, divided by expressions specifying a total a total economic value of hydrogen and coproducts produced at the process plant 10.

Finally, for illustration purposes, consider the specific examples given above in relation to the data acquisition module 116 where the input data obtained includes one or more of the following measurable and/or determinable parameters: a quantity of hydrogen produced; a quantity of electricity consumed; a quantity of steam produced; a quantity of syngas produced; a quantity of carbon monoxide produced; and a quantity of electricity produced.

In this context, examples of linear terms may include: the ratio (natural gas consumed)/(hydrogen produced); the ratio (electricity consumed)/(hydrogen produced); the ratio (steam produced)/(hydrogen produced); and the ratio (electricity produced)/(hydrogen produced).

In the above examples, the non-linear transformation in each case is the determination of the ratio. Consequently, the non-linear transformation of the input parameters of natural gas consumed and hydrogen consumed is (natural gas consumed)/(hydrogen produced) to produce the relevant linear term, and so on.

The method proceeds to step 230.

Step 230: Generate Control System Carbon Intensity Values

At step 230, the linear terms derived in step 220 may be utilized to generate control system carbon intensity values representative of the carbon intensity of hydrogen produced by the hydrogen production facility.

The control system carbon intensity values are calculated from a linear combination of the linear terms. By this is meant that the carbon intensity values are obtained from the sum of the product of each linear term with a corresponding linear coefficient.

The linear coefficient in each case corresponds to a scaling factor or weighting applied to each linear term. This may be selected as appropriate based on suitable physical, dynamic or mathematical considerations. In embodiments, as described below, the linear coefficients may be determined from one or more carbon intensity reference models.

Step 240: Generate Control Setpoints

At step 240, using the control system carbon intensity values produced in step 230, control variables for controlling one or more operational parameters of the hydrogen production facility can be generated.

Once the carbon intensity values have been derived, they can be sent to the production control module 120 to enable control of the production facility 10. In embodiments, the generated carbon intensity values correspond to those of one or more reference models. These can be used by a suitable control system to generate control setpoints to enable control of the production facility 10 in accordance with desired carbon intensity requirements.

The control system 110 is operable to adjust one or more operational parameters of the production facility 10 by generating a setpoint value for the production rate of each production facility 10 and communicating the setpoint value to each respective production facility 10.

In embodiments, the processing performed in step 220 generates a set of linear terms based on non-linear transformations of the relevant input parameters for the production facility 10. The carbon intensity values are then calculated in step 230 as a linear combination of the generated linear terms.

In embodiments, the linear terms may be represented as rational functions, i.e. functions where the numerator and denominator comprise polynomials. Any of the linear terms generated in step 220 may be described in this manner.

Consequently, in embodiments, the rational functions so generated may be utilized in step 240 by the control system 110 to generate control setpoints for control of the processes of the production facility 10.

In embodiments, the process control module 120 of the control system 110 may comprise a digital control system (DCS) using a model predictive controller which supports a family of variable transformations such as rational functions.

As a result, step 240 may comprise implementing a model predictive controller operable to utilize the rational functions generated from the linear terms and/or carbon intensity values and generate control signals therefrom.

Step 250: Control Production Facility

At step 250 the hydrogen production facility 10 can be controlled in accordance with the determined control variable setpoints.

The operational parameter setpoint values may be determined by the process control module 120 and may be provided to the process controller 140 which is operable to control the production facility 10 dynamically (through control elements 10-1C, 10-20, 10-3C, 10-4C . . . 10-nC) in response to this data.

In specific embodiments, the generated control variables for control of production rates may be utilized in a model predictive control (MPC) system. In embodiments, the MPC system comprises a multivariable control algorithm that utilizes an internal dynamic model of the production facility 10-1, 10-2, 10-3, 10-4 components, an appropriate cost function, and an optimization algorithm. In embodiments, the optimization algorithm is operable to minimize the cost function using a plurality of control inputs to control elements 10-1C, 10-20, 10-3C, 10-4C . . . 10-nC.

However, in embodiments, alternative functions may be used. These may involve, for example, similarity functions which are maximized.

In embodiments, controlling the hydrogen production facility 10 in accordance with the values of the control variables may comprise receiving, by the process controller 140, production facility 10-1, 10-2, 10-3, 10-4 rate values determined by the process control module 120 and deriving a production facility 10-1, 10-2, 10-3, 10-4 operation policy including set point operation parameters over a predetermined future time horizon.

Control is then effected through the control elements 10-1C, 10-20, 10-3C, 10-4C . . . 10-nC to control the relevant processes controlled thereby. In embodiments, this process may utilize linear empirical models obtained by system identification of the various processes.

Alternatively or additionally, in embodiments, the process may utilize non-linear high-fidelity models or non-linear models created from a machine learning algorithm. The process controller 140, knowing the desired production facility 10-1, 10-2, 10-3, 10-4 rates, may utilize the MPC system to optimize the control set points and processes for a present time period, whilst also being able to adapt for future time periods. This is achieved, in embodiments, by optimizing a finite time horizon for the processes whilst implementing the current time period. The optimization is then performed again at the next time period for another finite time horizon.

In embodiments, steps 210 to 250 may be repeated in a closed control loop cycle on a frequency of the order of minutes. In specific embodiments, the control loop cycle frequency may be every 5 minutes. In specific embodiments, the control loop cycle frequency may be every 15 minutes.

Steps 260 to 270 define an additional process, described below.

Step 260: Process Linear Terms

At step 260, the linear terms determined by the carbon intensity determination module 118 in step 220 are obtained and one or more non-linear transformations are applied to the linear terms to generate reference model inputs.

The reference model inputs may, in embodiments, comprise inputs to one or more cells in the Excel reference model. The non-linear transforms enable the correct reference model inputs to be determined based on the linear terms. The non-linear transforms may be dependent upon the reference model used.

For example, in the US GREET model one of the reference model inputs is the efficiency ratio n=(hydrogen produced)/(natural gas consumed+electricity consumed). If the linear terms comprise A=(natural gas consumed)/(hydrogen produced) and B=(electricity consumed)/(hydrogen produced), the nonlinear transformation T which converts A and B to $\eta$ is $\eta=T(A,B)=1/(A+B)$. It can be verified through algebraic manipulation that the transformation T is exactly correct.

The method proceeds to step 270.

Step 270: Generate Reference Model

The reference model inputs are inputted into a reference model. In embodiments, the reference model may comprise a Microsoft Excel workbook. The reference model inputs thus generate an updated reference model.

Step 280: Determine Reference Carbon Intensities

At step 280, the updated reference model is then operable to determine reference carbon intensities directly using an applicable carbon intensity reference model. The resulting carbon intensity data may be stored in memory 114.

The reference model module 150 may process linear term data at a lower frequency than the processing of measurement sensor data by the carbon intensity determination module 118.

Step 290: Update Linear Coefficients

At step 290, the update module 160 is operable to use the determined reference carbon intensities produced by the reference model in the reference model module 150 in step 280 to update the linear coefficients used to generate the control carbon intensity values by the carbon intensity determination module 118.

The update module 160 utilizes the determined reference carbon intensities produced by the reference model in the reference model module 150 and the linear terms generated by the carbon intensity determination module 118 to generate updated linear coefficients. The updated linear coefficients are sent to the carbon intensity determination module 118 periodically. These are then used in step 230 to generate updated carbon intensity control data.

In embodiments, the update module 160 may process data and generate updated data at a lower frequency than the processing of measurement sensor data by the carbon intensity determination module 118. In embodiments, the update module 160 may process data and generate updated data at a lower frequency than the reference model module 150 processes data to generate an updated reference model.

OPERATIONAL EXAMPLE

FIGS. 4 to 8 show aspects of implementation for control of hydrogen production from natural gas with carbon intensities calculated using the US GREET reference model.

In embodiments, a hydrogen production facility is used to produce hydrogen from natural gas. Electricity is used to drive fans, pumps, and controllers in the facility. The plant produces a steam coproduct. Carbon dioxide generated in the process of converting hydrogen to natural gas is captured and sequestered.

The United States Inflation Reduction Act requires that hydrogen producers quantify the carbon intensity of hydrogen production using the US GREET model. The US GREET model is a large excel workbook with over 60 worksheets and tens of thousands of parameters. A screenshot of a portion of one worksheet in the US GREET model is show in FIG. 4.

The US GREET excel model typically takes 60 seconds to perform a carbon intensity calculation. Furthermore, it is not feasible to directly integrate an Excel model in a real-time digital control system (DCS) such as those which are typically used to control large industrial facilities.

Thus, it is desirable to utilize the method and system of the present invention for calculating carbon intensities for the purpose of controlling the facility such as typically done with a digital control system (DCS) and model predictive control such as is typically done using ASPEN DMC Plus.

Figure 5:
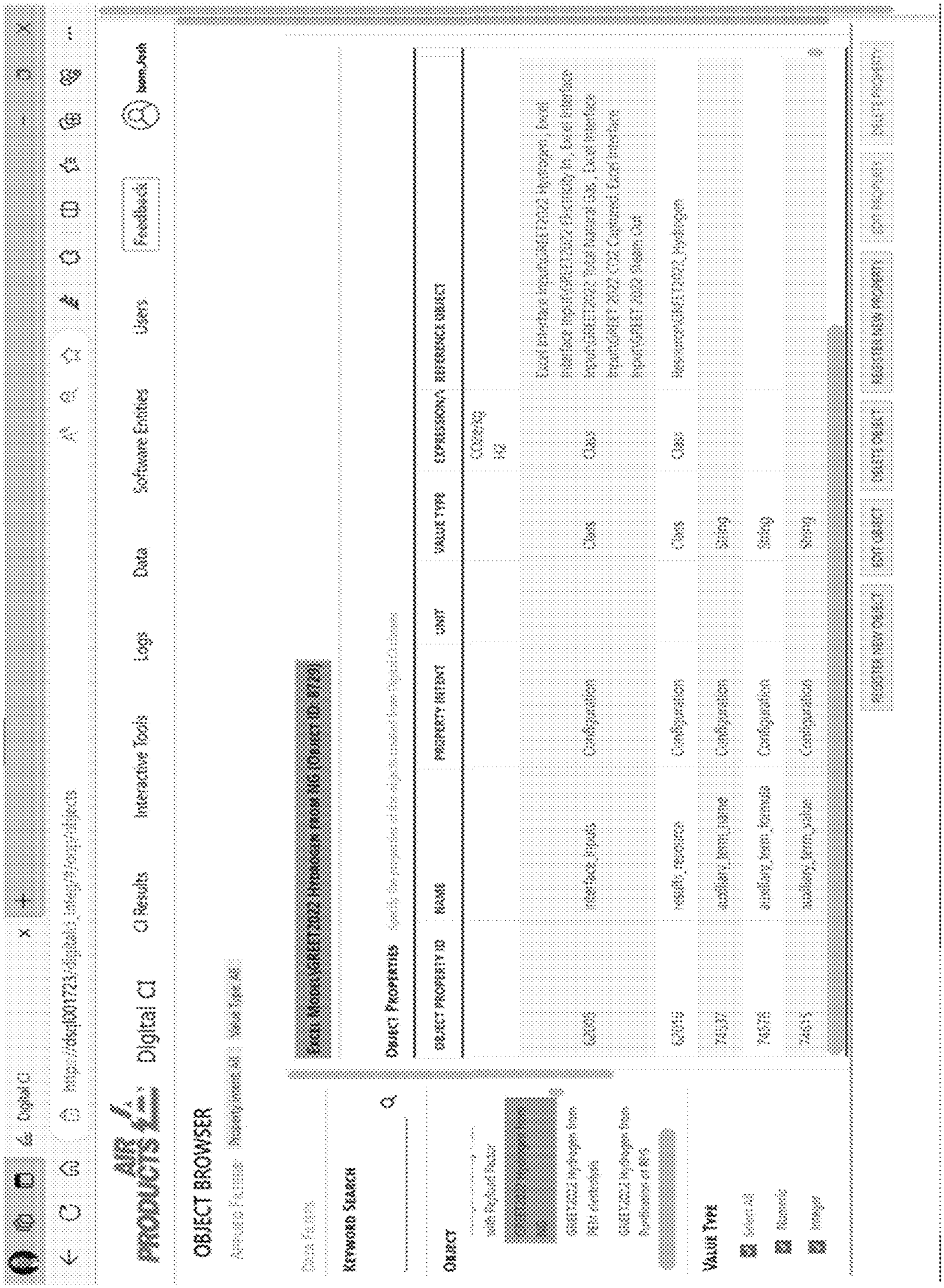

FIG. 5 is a screenshot showing the configuration of measured quantities used in an embodiment of the invention, the measured quantities used to calculate carbon intensity comprise a measurement of the rate of production of hydrogen, a measurement of the rate of consumption of electricity, a measurement of the rate of consumption of natural gas, a measurement of the rate of capture of carbon dioxide, and a measurement of the rate of steam production.

Figure 6:
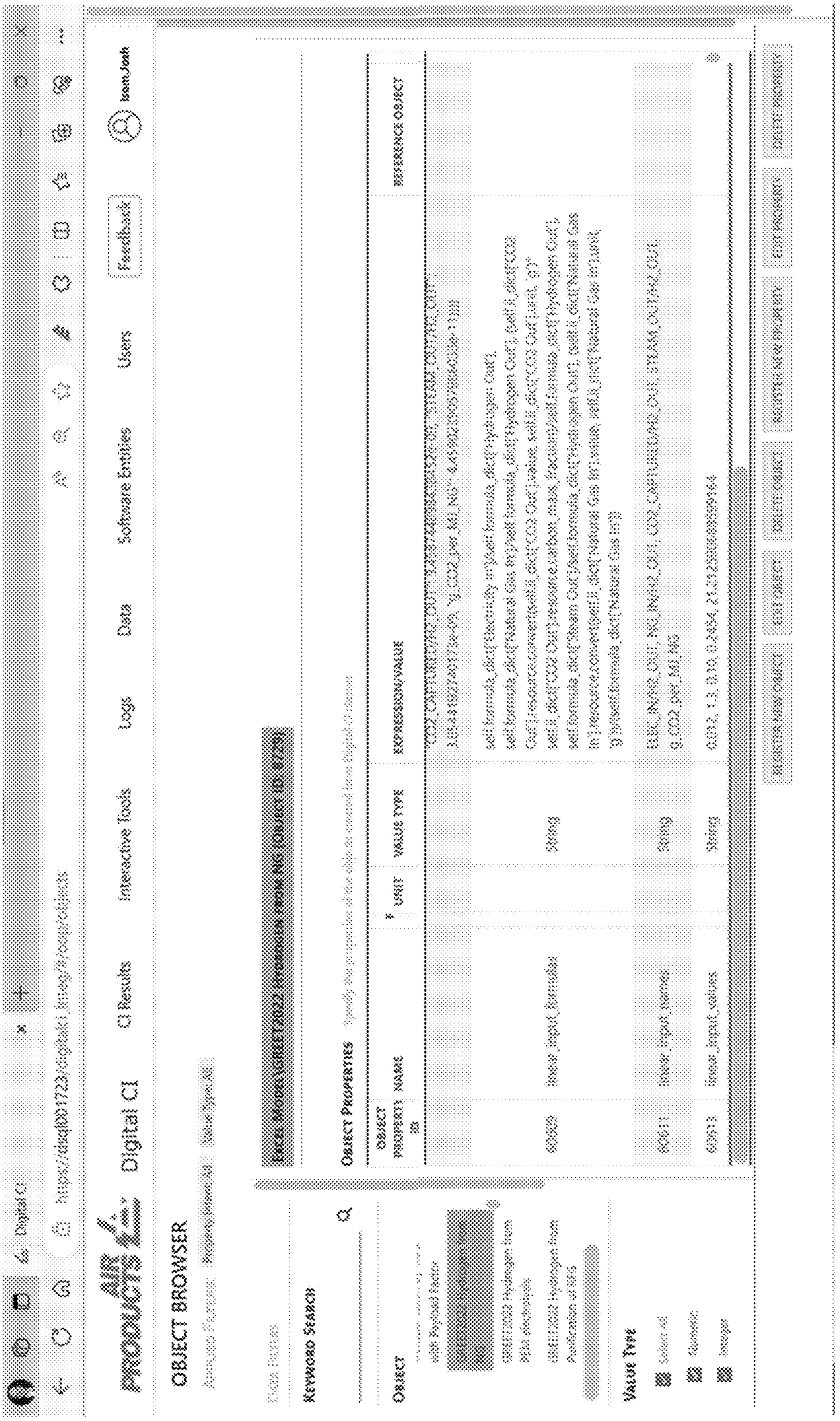

FIG. 6 is a screenshot showing the configuration of the nonlinear transformations and the linear terms used in an exemplary embodiment of the invention. As shown in the Python code which is associated with the object property "linear_input_formulas", there are four linear terms comprising:

The quantity (rate of consumption of electricity)/(rate of production of hydrogen), designated as ELEC_IN/H2_OUT.

The quantity (rate of consumption of natural gas)/(rate of production of hydrogen), designated as NG_IN/H2_OUT.

The quantity (rate of capture of carbon dioxide)/(rate of production of hydrogen), designated as CO2_OUT/H2_OUT.

The quantity (rate of steam production)/(rate of production of hydrogen), designated as STEAM_OUT/H2_OUT.

Figure 7:
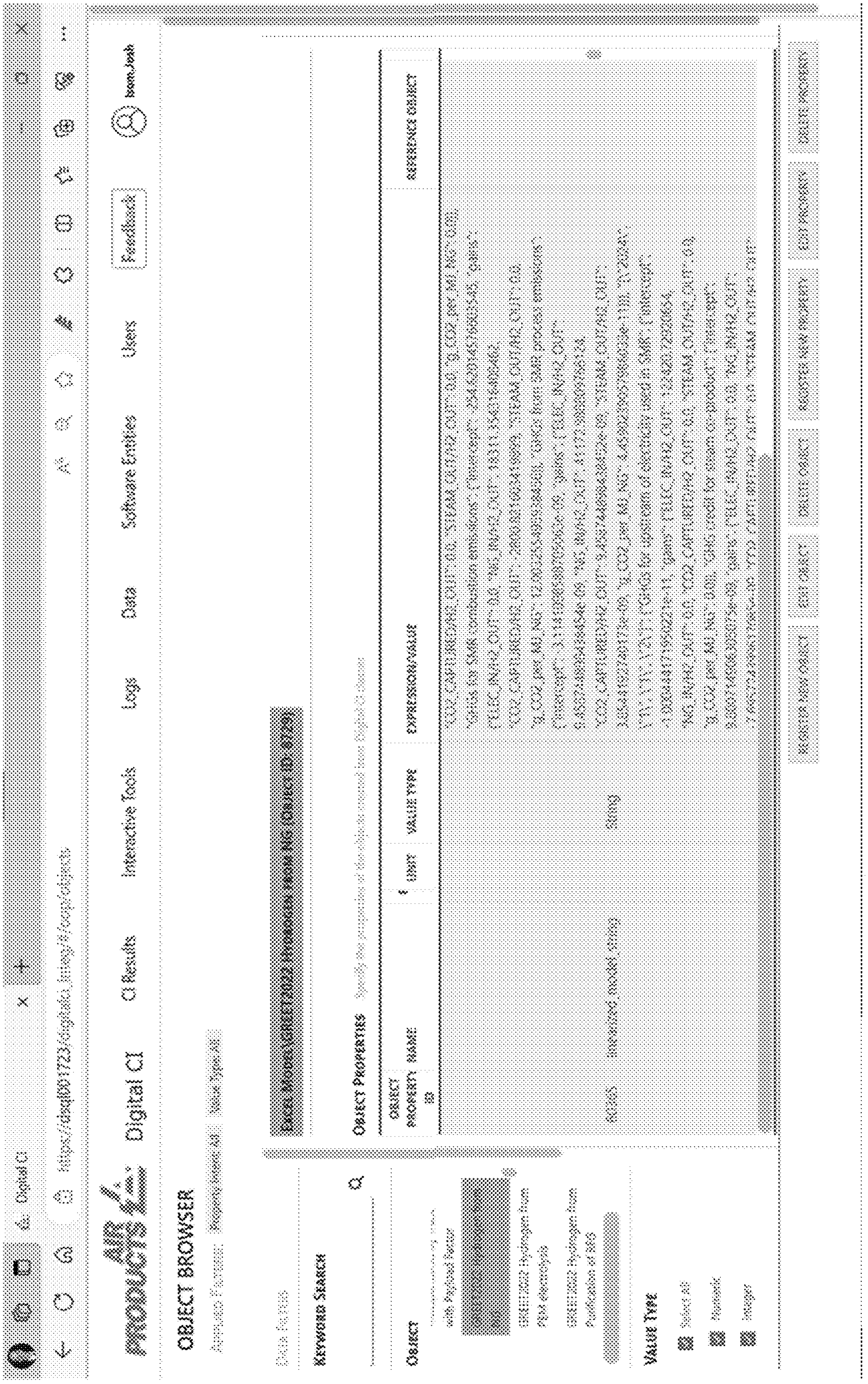

FIG. 7 shows the configuration of a model for the calculation of the carbon intensity of hydrogen produced from natural gas. Specifically, it shows the linear coefficients used to form linear combinations of the linear terms. For example, GHG emissions for combustion in a steam methane reformer (SMR) is calculated using the following linear formula:

$$[\textit{GHGs}\text{ for }\textit{SMR}\text{ combustion emmissions}] = -254.6 + 18311 * [\text{NG\_IN/H2\_OUT}] - 2800 * [\text{CO2\_CAPTURED/H2\_OUT}].$$

Figure 8:
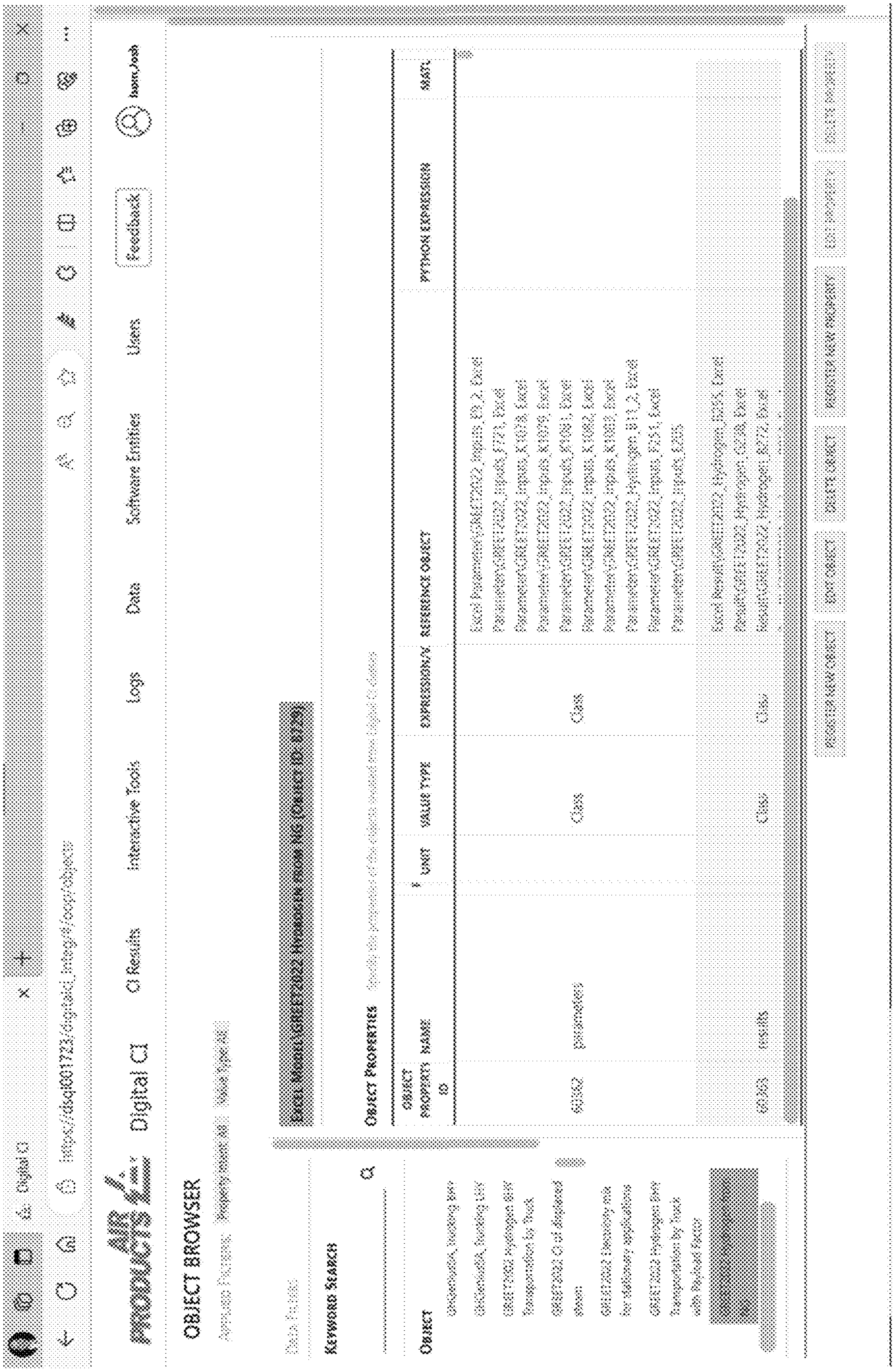

FIG. 8 shows the configuration of reference model inputs 70 that are used in the reference model to calculate GHG emissions associated with producing hydrogen from natural gas. For this model, the reference model inputs comprise:

Cell E9 on the "Inputs" sheet in the GREET2022 Excel model

Cell F721 on the "Inputs" sheet in the GREET2022 Excel model

Cell K1078 on the "Inputs" sheet in the GREET2022 Excel model

Cell K1079 on the "Inputs" sheet in the GREET2022 Excel model

Cell K1081 on the "Inputs" sheet in the GREET2022 Excel model

Cell K1082 on the "Inputs" sheet in the GREET2022 Excel model

Cell K1083 on the "Inputs" sheet in the GREET2022 Excel model

Cell B11 on the "Hydrogen" sheet in the GREET2022 Excel model

Cell F251 on the "Inputs" sheet in the GREET2022 Excel model

Figure 9:
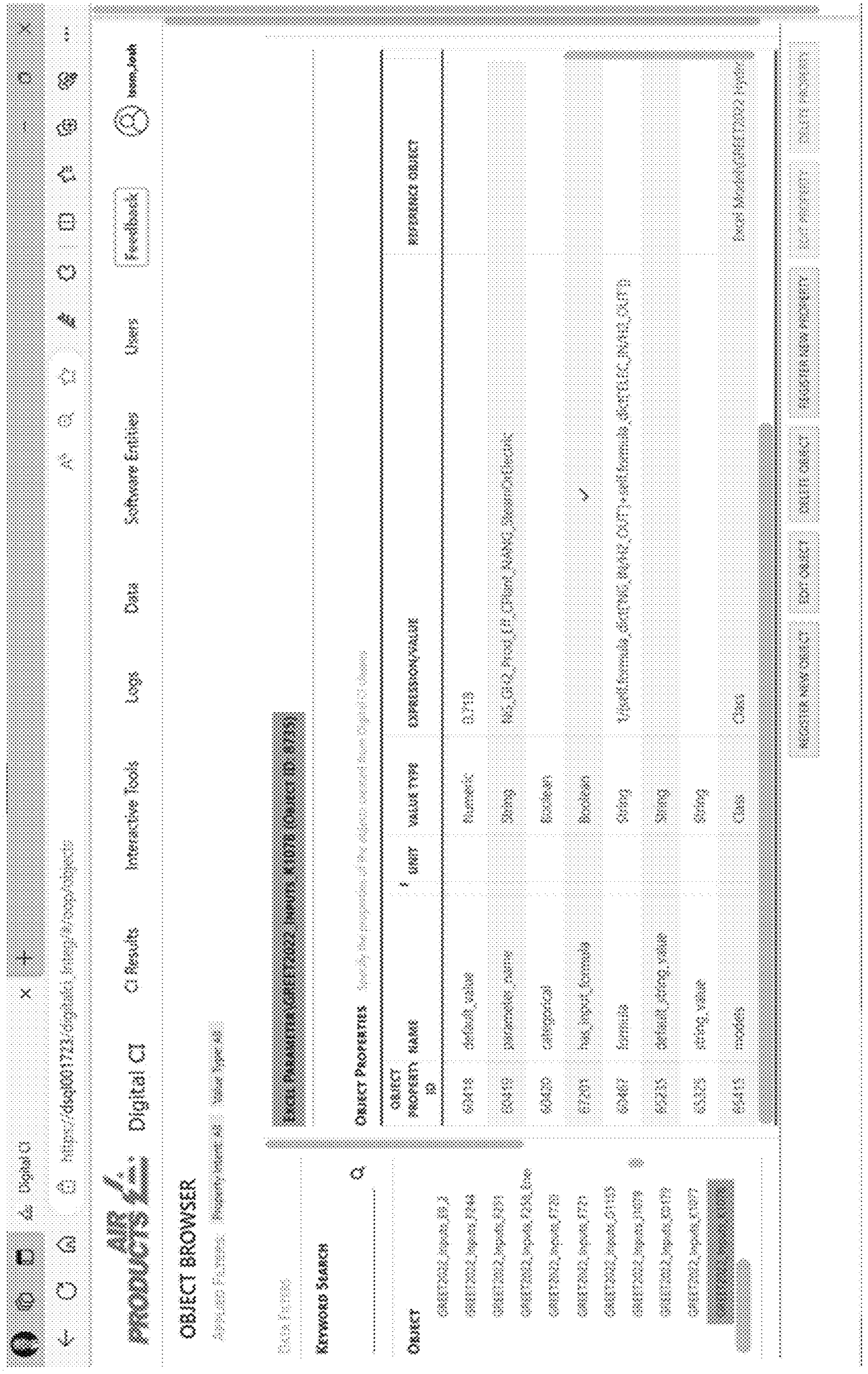

Nonlinear transformations 60 are used to compute the values of reference model inputs 70. An example of a nonlinear transformation 60 is provided in FIG. 9. In this example the nonlinear transformation 60 used to calculate the reference model input cell K1078 on the Inputs model sheet of the reference model 80 GREET2022, as a function of the linear terms 30 is $$[\text{Cell }K1078] = 1/(\text{NG\_IN/H2\_OUT} + \text{ELEC\_IN/H2\_OUT})$$

In the real-time control system, measured quantities are read from sensors and nonlinear transformations are used to produce linear terms, which are then multiplied by linear coefficients to produce linear combinations which are summed to produce control system carbon intensities which are then used by a plant control system to adjust plant rates. Linear terms and control system carbon intensities are stored. This mechanism for calculating carbon intensities is highly accurate and extremely computationally efficient.

At a lower frequency, and outside the real-time control system, nonlinear transformations are used to calculate reference model inputs which are provided to a reference model, typically a large Excel model, which is used to calculate reference carbon intensities which are also stored. The reference model may not be computationally efficient and may not be suitable for integration with a real-time control system. The reference carbon intensities are typically exactly equal to the control system carbon intensities and computing the reference carbon intensities with the reference model and comparing them to the control system carbon intensities can be used to validate the control system carbon intensities.

From time to time, the reference model may be updated by regulatory or scientific bodies. For example, the US GREET model is typically updated yearly by Argonne National Labs in the month of October. When these updates occur, the linear terms and the corresponding reference carbon intensities can be used to in a process of updating the linear coefficients. This ensures that the calculations for the control system for low-carbon hydrogen supply stay accurate when reference models are updated.

It will be appreciated by the person of skill in the art that various modifications may be made to the above-described examples without departing from the scope of the invention as defined by the appended claims.

While the invention has been described with reference to the preferred embodiments depicted in the figures, it will be appreciated that various modifications are possible within the spirit or scope of the invention as defined in the following claims.

For example, whilst some of the above exemplary embodiments have been described in the context of a hydrogen supply network for supplying hydrogen fuel, the invention is not so limited. The invention is equally applicable to the process of providing hydrogen having a defined carbon intensity value to an end user location for purposes other than as a fuel. In other words, in embodiments, the hydrogen supply network may be considered to be a hydrogen supply network for the supply of hydrogen for any suitable purpose.

It will be understood that the term "control" as used herein may, in embodiments, refer to a systematic plan or set of actions designed to manage and optimize the operation of one or more hydrogen production facilities, in order to produce fuel with a defined carbon intensity value, while considering factors such as feedstock carbon intensity, demand data, and process constraints.

It will be understood that the term "control" as used herein may refer to the management and regulation of the operations of the industrial plants of the industrial processing facility, ensuring that the production of hydrogen and/or hydrogen fuel adheres to the defined carbon intensity value and other constraints set by the optimization model.

It will be understood that the term "fuel" as used herein may refer to any type of fuel used to power processes (including industrial processes) for turning stored fuel energy into useful work. The term "fuel" used herein may include, but is not limited to, "transportation fuels" used to power vehicles for the purpose of facilitating the movement of people or goods.

It will be understood that the term "Defined carbon intensity (CI) value" as used herein may refer to a predetermined or specified value for the greenhouse gas emissions associated with the production, processing and distribution of a product such as hydrogen or hydrogen fuel, expressed in terms of mass of carbon dioxide equivalent per unit of energy, and used as a target or constraint in the optimization process for producing the fuel in an environmentally sustainable manner.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules", "units" or "components," these terms should not limited to single units or functions. In addition, functionality attributed to some of the modules or components described herein may be combined and attributed to fewer modules or components.

It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

The invention claimed is:

1. A computer-implemented method of operating a hydrogen production facility to meet carbon intensity (CI) requirements, the method being executed by at least one hardware processor and comprising:

receiving, using a computer system, operational parameter data from the hydrogen production facility, the operational parameter data being representative of measured and/or determined time-dependent values of one or more operational parameters of the hydrogen production facility, the operational parameter data comprising measured and/or determined time-dependent values for one or more operational parameters relating to materials and/or energy input to the hydrogen production facility and materials and/or energy output from the hydrogen production facility;

processing, using a computer system, the operational parameter data to define one or more linear terms for one or more operational parameters associated with the hydrogen production facility, wherein the linear terms are linear with respect to one or more CI reference models and one or more of the linear terms specify a measured energy input to the hydrogen production facility or a measured material flow input to the hydrogen production facility divided by one of:

i) a total mass flow rate of hydrogen and coproducts produced at the hydrogen production facility, ii) a total molar flow rate of hydrogen and coproducts produced at the hydrogen production facility, or iii) a total economic value of hydrogen and coproducts produced at the hydrogen production facility;

generating, from the one or more linear terms, control system CI values representative of the CI of hydrogen produced by the hydrogen production facility;

generating, using a computer system and based on a function of the control system CI values, control variables for controlling one or more operational parameters of the hydrogen production facility; and controlling the hydrogen production facility in accordance with the determined control variables.

2. The computer-implemented method of claim 1, wherein one or more of the linear terms specify a measured energy or material flow input to the hydrogen production facility divided by a total energy rate of hydrogen and coproducts produced at the hydrogen production facility.

3. The computer-implemented method of claim 2, wherein one or more coproducts comprises a gas and the total energy rate is determined as the product of the flow rate of the gas and its lower heating value.

4. The computer-implemented method of claim 3, wherein a coproduct comprises electricity and the energy rate is the generated electric power.

5. The computer-implemented method of claim 1, wherein the step of generating control system CI values comprises determining a sum of the product of each of the one or more linear terms with a corresponding linear coefficient, the linear coefficients being derived from one or more of the CI reference models.

6. The computer-implemented method of claim 5, further comprising the step of updating the linear coefficients based on a perturbation of one or more of the CI reference models.

7. The computer-implemented method of claim 1, wherein the one or more operational parameters include one or more of: a quantity of hydrogen produced; a quantity of electricity consumed; a quantity of steam produced; a quantity of syngas produced; a quantity of carbon monoxide produced; and a quantity of electricity produced.

8. The computer-implemented method of claim 1, wherein the step of processing comprises applying one or more non-linear transforms to the operational parameter data for one or more operational parameters to define the one or more linear terms.

9. The computer-implemented method of claim 1, wherein the steps of generating control variables and controlling the hydrogen production facility utilize model predictive control.

10. A system for operating a hydrogen production facility to meet carbon intensity (CI) requirements, the system comprising:

at least one hardware processor:

a data acquisition module configured to receive operational parameter data from the hydrogen production facility, the operational parameter data being representative of measured and/or determined time-dependent values of one or more operational parameters of the hydrogen production facility, the operational parameter data comprising measured and/or determined time-dependent values for one or more operational parameters relating to materials and/or energy input to the hydrogen production facility and materials and/or energy output from the hydrogen production facility;

a CI determination module configured:

to process the operational parameter data to define one or more linear terms for one or more operational parameters associated with the hydrogen production facility, wherein the linear terms are linear with respect to one or more carbon intensity reference models and one or more of the linear terms specify a measured energy input to the hydrogen production facility or a measured material flow input to the hydrogen production facility divided by one of:

i) a total mass flow rate of hydrogen and coproducts produced at the hydrogen production facility, ii) a total molar flow rate of hydrogen and coproducts produced at the hydrogen production facility, or iii) a total economic value of hydrogen and coproducts produced at the hydrogen production facility; and to generate, from the one or more linear terms, control system CI values representative of the CI of hydrogen produced by the hydrogen production facility;

a production control module configured to generate, based on a function of the control system CI values, control variables for controlling one or more operational parameters of the hydrogen production facility; and a process controller configured to control the hydrogen production facility in accordance with the determined control variables.

11. The system of claim 10, wherein the CI determination module is configured to apply one or more non-linear transforms to the operational parameter data for one or more operational parameters to define the one or more linear terms.

12. The system of claim 10, wherein one or more coproducts comprises a gas and the total energy rate is determined as the product of the flow rate of the gas and its lower heating value and/or wherein a coproduct comprises electricity and the energy rate is the generated electric power.

13. The system of claim 10, wherein the production control module and process controller comprise a model predictive controller operable to generate the control variables and control the hydrogen production facility.

14. A non-transitory computer readable storage medium storing a program of instructions executable by a machine to perform a method of operating a hydrogen production facility to meet carbon intensity (CI) requirements, the method being executed by at least one hardware processor and comprising:

receiving, using a computer system, operational parameter data from the hydrogen production facility, the operational parameter data being representative of measured and/or determined time-dependent values of one or more operational parameters of the hydrogen production facility, the operational parameter data comprising measured and/or determined time-dependent values for one or more operational parameters relating to materials and/or energy input to the hydrogen production facility and materials and/or energy output from the hydrogen production facility;

processing, using a computer system, the operational parameter data to define one or more linear terms for one or more operational parameters associated with the hydrogen production facility, wherein the linear terms are linear with respect to one or more carbon intensity reference models and one or more of the linear terms specify a measured energy input to the hydrogen production facility or a measured material flow input to the hydrogen production facility divided by one of:

i) a total mass flow rate of hydrogen and coproducts produced at the hydrogen production facility, ii) a total molar flow rate of hydrogen and coproducts produced at the hydrogen production facility, or iii) a total economic value of hydrogen and coproducts produced at the hydrogen production facility;

generating, from the one or more linear terms, control system CI values representative of the CI of hydrogen produced by the hydrogen production facility;

generating, using a computer system and based on a function of the control system CI values, control variables for controlling one or more operational parameters of the hydrogen production facility; and controlling the hydrogen production facility in accordance with the determined control variables.

15. The non-transitory computer readable storage medium of claim 14, wherein the generating control system CI values comprises determining a sum of the product of each of the one or more linear terms with a corresponding linear coefficient, the linear coefficients being derived from one or more of the CI reference models.

* * * * *